United States Patent [19]
Shindou

[11] Patent Number: 6,145,099
[45] Date of Patent: Nov. 7, 2000

[54] DEBUGGING SYSTEM

[75] Inventor: Keisuke Shindou, Tokyo, Japan

[73] Assignee: NEC Corporation, Tokyo, Japan

[21] Appl. No.: 08/910,800

[22] Filed: Aug. 13, 1997

[30] Foreign Application Priority Data

Aug. 13, 1996 [JP] Japan .................................. 8-213676
Jun. 11, 1997 [JP] Japan .................................. 9-153926

[51] Int. Cl.$^7$ .................................................. G06F 15/20
[52] U.S. Cl. .............................................................. 714/37
[58] Field of Search ........................ 371/19; 395/183.13,
395/200.54, 500; 307/269; 364/551.01;
327/116; 714/37; 709/224, 222; 370/324,
503

[56] References Cited

U.S. PATENT DOCUMENTS

| | | | |
|---|---|---|---|
| 5,101,117 | 3/1992 | Johnson et al. | 307/269 |
| 5,313,618 | 5/1994 | Pawloski | 395/500 |
| 5,371,746 | 12/1994 | Yamashita et al. | 371/19 |
| 5,537,536 | 7/1996 | Groves | 395/183.04 |
| 5,627,766 | 5/1997 | Beaven | 364/551.01 |
| 5,642,478 | 6/1997 | Chen et al. | 395/183.21 |
| 5,715,435 | 2/1998 | Ikei | 395/500 |
| 5,754,759 | 5/1998 | Clarke et al. | 395/183.13 |
| 5,764,885 | 6/1998 | Sites et al. | 395/183.21 |
| 5,793,976 | 8/1998 | Chen et al. | 385/200.54 |
| 5,834,956 | 11/1998 | Pathikonda et al. | 327/116 |

FOREIGN PATENT DOCUMENTS 5224989 9/1993 Japan .

*Primary Examiner*—Joseph E. Palys
*Assistant Examiner*—Omar A. Omar
*Attorney, Agent, or Firm*—Scully, Scott, Murphy & Presser

[57] ABSTRACT

In a debugging system for use in realizing simultaneously complete observation of internal operation and reproduction of malfunction actually caused in a target system which includes an integrated circuit, such as a microprocessor, contents of a memory and an internal initial state of the target system are snooped and stored in a snoop unit and a trace memory, respectively, both of which are included in a probe unit attached to the target system. The internal operation and the reproduction are simulated by a software simulator model by the use of the contents and the internal initial state which are stored in the trace memory and which are sent from the probe unit.

13 Claims, 17 Drawing Sheets

| STATES | MEANINGS |
|---|---|
| SEQ | EXECUTING IN THE ORDER OF ADDRESSES |
| TSQ | GENERATION OF A TRACE TRIGGER WHEN THE EXECUTION IS MADE IN THE ORDER OF ADDRESSES |
| STL | A STALL OF PIPELINES |
| TST | OCCURRENCE OF TRACE TRIGGER DURING A STALL OF PIPELINE |
| JMP | OCCURRENCE OF JUMP WITH PROGRAM COUNTER OUTPUT |
| NPC | OCCURRENCE OF JUMP WITHOUT PROGRAM COUNTER OUTPUT |
| EXP | OCCURRENCE OF EXCEPTIONS |
| DBM | DEBUGGING MODE (EXECUTING A MONITOR PROGRAM) |

FIG. 3
PRIOR ART

CONTENTS OF TRACE MEMORY 103

| ADDRESS | EVENT | TIME | PROPERTY |
|---------|-------|------|----------|
| 0 0 0 0 | READY | 10 | 0 1 0 1 0 1 0 1 1 1 1 1 1 1 1 1 |
| 0 0 0 1 | INT | 40 | INT1 ENABLE |
| 0 0 0 2 | I / O READ | 52 | 003F |
| 0 0 0 3 | READY | 80 | 0 1 0 1 0 1 0 1 1 1 1 1 1 1 1 1 |
| 0 0 0 4 | READY | 9A | 0 1 0 1 0 1 0 1 1 1 1 1 1 1 1 1 |
| 0 0 0 5 | READY | B0 | 0 1 0 1 0 1 0 1 1 1 1 1 0 1 0 1 |
| 0 0 0 6 | READY | C0 | 0 1 0 1 0 1 0 1 1 1 1 1 1 1 1 1 |
| 0 0 0 7 | I / O READ | D0 | 003F |
| 0 0 0 8 | READY | FC | 0 1 0 1 0 1 0 1 1 1 1 1 1 1 1 1 |
| 0 0 0 9 | READY | 110 | 0 1 0 1 0 1 0 1 1 1 1 1 1 1 1 1 |
| 0 0 0 A | INT | 113 | INT1 DISABLE |

FIG. 7

DEBUGGING SYSTEM

BACKGROUND OF THE INVENTION

1. Field of the Invention

The present invention relates to a debugging system for use in analyzing operation in various kinds of systems, such as an LSI system which include a microprocessor and, in particular, to a software simulator. Such systems may be, for example, a system which uses a digital synchronizing circuit wherein internal operation can not be directly monitored, a system including an interface which is located between synchronizing circuits and wherein direct monitoring of operation is difficult, or a system using an asynchronous interface such as a serial interface, a high speed bus interface or the like between synchronizing circuits.

2. Description of Related Art

In general, it is a recent trend that not only a single function but also a plurality of functions are incorporated in one chip in a functional LSI represented by a microprocessor with development of the micro fabrication technology. This enables a high speed operation of the system, a multifunction of the system, and a reduction in power consumption of the system and a low cost of the system.

In a system which includes a microprocessor, requirements have been made not only about development of hardware but also about development of a system cooperating with software executed by the microprocessor. Recently, the system tends to become very large and complicated. This renders software and hardware into very large sizes and makes debugging difficult more and more. Further, in order to efficiently carry out the debugging, the operation of the system needs to be observed in details.

Generally, it is possible in a debugging system to observe signals appearing at external terminals of an LSI chip but not to observe signals generated within the LSI chip. Meanwhile, in a microprocessor constituted by an LSI chip of an old type, an operation sequence of an instruction can be observed from outside at every minimum step by writing the instruction from an external memory through an external terminal of the chip.

Herein, it is noted that, with the progress of circuit integration technology, a cache memory tends to be internally included in an LSI chip to execute each instruction. With this structure, most of operation concerned with a writing operation of each instruction is carried out by the use of the cache memory. As a result, it becomes difficult to observe behavior executed in connection with an instruction, by the use of an external terminal of the LSI chip.

Furthermore, a timer, a serial interface, and the like other than the microprocessor is apt to be internally included in the LSI chip. Under the circumstances, this structure make it difficult to analyze behavior of the timer, the serial interface, and the like from an external device and also makes it very difficult to execute debugging operation concerned with these elements.

Taking the above into consideration, a debugging system has been proposed in Japanese Unexamined Patent Publication No. JP-A-5-224989, namely, 224989/1993.

First, description will be made about an outline of a debugging system of a processor which is disclosed in the above publication and which internally includes a cache memory in reference to FIG. 1 (hereinafter, referred to as Conventional Example 1).

A microprocessor 701 which internally includes a cache memory is connected to a main memory 702 through buses. A trace analyzer 703 is connected to the buses to read access of the microprocessor 701 to the main memory 702 and to store it in a trace memory 704.

When the cache memory is kept in an inactive state, reading operations of an instruction of the processor 701 are all carried out of the main memory 702. Accordingly, contents can completely be monitored by the trace analyzer 703. However, when the cache memory is kept in an active state, contents followed by execution of an instruction cannot be monitored by the trace analyzer 703. In this event, a mode display signal 705, an instruction execution start signal 706, a branch instruction occurrence signal 707, and an interruption branch occurrence signal 708 are transmitted from the microprocessor 701 to the trace analyzer 703.

In the active state of the cache memory, the trace analyzer can uniquely estimate an operation of unbranching a program and a static conditional branch operation indicated at a branch destination address, in response to the instruction execution start signal 706 and the branch instruction occurrence signal 707.

Meanwhile, in a branch operation where an address is dynamically determined, estimation of the operation is not feasible only by these terminals. In this case, the trace analyzer 703 should temporarily stop an operation of the microprocessor by sending an interruption to the microprocessor and should confirm the address related to the operation.

However, the stoppage of the operation makes it actually impossible to observe an actual system in real time.

Also, another conventional debugging system has been also disclosed in "Nikkei Electronics, Jul. 31, 1995, pp. 133). Such a conventional debugging system will be described with reference to FIG. 2 and will be referred to as Conventional Example 2. Briefly, the debugging system has a function of supplying branch information to an external device.

Specifically, the illustrated debugging system is formed by a microprocessor 800 and a debugging tool or a trace analyzer 803. In the microprocessor 800 placed on a print board, a debugging circuit 802 which is used only for debugging is connected to a CPU core 801 and is connected to the trace analyzer 803 via a special purpose pin 804 only for debugging. The CPU core 801 supplies output signals to the trace analyzer 803 in synchronism with a sequence of clocks to transmit a state of the CPU core 801 at each clock to the trace analyzer 803. The number of the buses which are used to transmit the signals in the system is equal to four and is comparatively small in comparison with internal states of the microprocessor 800 to be transmitted.

In FIG. 3, illustration is made about a part of contents of signals which are transmitted to the trace analyzer 803 via the special purpose pin 804 for debugging. In each state shown in FIG. 3, a necessary number of instruction execution states is transmitted from the debugging circuit 802 at each clock sent from the CPU core 801. In addition to the illustrated states, a branch destination address is transmitted to the trace analyzer 803 over 30 clocks only when a branch instruction JMP which is undetermined yet appears.

This structure makes it possible to observe a branch to an undetermined address. Thus, a branch to an undetermined address, such as a register indirect jump or the like, which can not be feasible in Conventional Example 1, can be observed without stopping the system. However, such a branch can be observed on one condition that a next following undetermined branch never occurs within the time period of 30 clocks.

Referring to FIG. 4, description will be made about a conventional software simulator which is for use in debugging software (hereinafter, referred to as Conventional Example 3).

A simulation model 401 includes all of models of a system constituted by an instruction executing unit 410, CPU 412 including a cache memory 411, a memory 415, I/O interfaces 1001 and 1002, and a bus 416 connected among them. In this connection, all of the illustrated elements may be considered as the models formed by software programs.

When a program memory initial state 402 is at first loaded into the software simulator, the simulation model 401 is operated at every clock and a result thereof is confirmed by an internal state monitor 404. Thereby, verification is made about normality of a formed system and operation of a program.

The advantage of the software simulator in Conventional Example 3 resides in that all of the operation of the microprocessor and the system can be monitored by a user so far as the models of the external I/O interfaces 1001 and 1002 are completely formed.

Meanwhile, the above-described Conventional Example 2 includes a mechanism for monitoring the operation of a program counter of the microprocessor to observe the execution order or a flow of the instructions. However, it is difficult to find out a cause of a malfunction only by the flow of the instructions, although the flow of the instructions give a clue for grasping the behavior of the system. That is, the malfunction to be corrected is not always caused to occur by the flow of the program per se but is often caused to occur on the basis of input data signals given from the system and a calculation result of the microprocessor. In the latter case, an analysis of the program is further needed for investigating the cause of the operation and correcting the cause.

In addition, an operator should completely understand programs and operation of the systems in the method mentioned in Conventional Example 2. However, inasmuch as an analysis of systems tends to become complexed, extensive, and expanded more and more, improvement of efficiency of debugging cannot probably cope with the enlargement of scale of system because there is a limit about ability of a human. Accordingly, a further support for a debugging environment has been requested.

In order to overcome the above-described drawback, the above-described Conventional Example 3 adopts the method where all of the necessary portions of a system are formed by software models which can observe the internal states. In this event, it is advantageous that not only the execution order of instructions but also all of the operations of the system can be observed with this structure. Moreover, observation can be made with this structure retroactively to a time point before the occurrence of an event to be observed.

However, the Conventional Example 3 has the following significant drawbacks also in comparison with the Conventional Example 2. That is, the software models should be prepared in connection with all hardware units which are present in the system. Furthermore, behavior of the system can not be practically directly reproduced when the malfunction occurs in an actual system. Accordingly, to specify a cause of actual malfunction, it is still indispensable for an operator of a debugging system to estimate the operation of the system and to thereafter identify the cause.

Under the circumstances, it has been found out that the Conventional Example 3 is suitable for aiding or assisting development but is not suitable for analyzing a cause of a malfunction which occurs undesirably in an actual system since the state of the malfunction cannot directly be observed.

At any rate, in analyzing operation of a system which is going to be complicated, both of direct observation of operation actually occurring in the system and detailed observation of an internal state will be simultaneously requested in a future system.

Further, in a large scale system like a recent system, there are the cases where respective synchronizing circuits are operated in synchronism with individual clocks. In this event, it is necessary to monitor input signals on simulating general synchronizing circuits. This brings about necessity of all asynchronous connections of such a device since the input signals need to be monitored on simulating the general synchronizing circuit. The method involves a drawback where all records of communication through asynchronous interfaces are necessary and, as a result, a buffer capacity becomes enormous.

If each interface is operable in synchronism with both of clocks, contents of the interface can be reproduced by using each of the simulation models thereof. However, such simulation models cannot be used in asynchronous transfer of clocks. This is because timings of transfer are varied relative to the clocks each time when execution is carried out. Under this state, all transfer signals should be monitored eventually. This results in necessity of a great amount of of signal hysteresis buffer. Therefore, requirement has been directed to a method of reproducing the contents of transfer only by monitoring a part of signals even in the case of asynchronous transfer.

Further, a high speed interface used in recent years requires electric properties of wirings strictly prescribed. This makes it difficult to connect a probe for observation to the interface from outside. As a result, it becomes difficult to monitor internal operation of a logical circuit and even to monitor all of inputs of signals. In a high speed transfer system, an interface appears which operates each device asynchronously with one another and which carries out synchronous transfer in accordance with synchronizing clocks. With this interface, internal operational timings in such a system cannot be predicted from outside although almost all of the system is constituted by synchronizing circuits. In addition, both systems are operated asynchronously with each other and, therefore, practical transfer timings cannot be accurately determined without actual observation.

Even in such a case having an asynchronous interface, observation of internal operation and coordinating operation are invariably needed. Under the circumstances, a debugging system has been required which is capable of observing internal operations by simulation.

SUMMARY OF THE INVENTION

It is an object of the present invention to provide a debugging system which is capable of observing internal states and operations.

It is other object of the present invention to provide a debugging system which is capable of reducing necessity of forming software models.

According to an aspect of the present invention, there is provided a debugging system which is used in a system having a high speed digital synchronizing circuit or a high speed interface too fast to be able to observe an internal operation thereof, the debugging system including outputting means for outputting in synchronism with a system clock input signals among elements of the system, accumulating means for accumulating as accumulated information by snooping output signals from the outputting means, and reproducing means for reproducing the internal operation of the synchronizing circuit or the high speed interface of the system by using the accumulated information. According to another aspect of the present invention, there is provided a debugging system which is used in a system using a logical circuit in synchronism with a system clock with a microprocessor as a core, the debugging system including initializing means for outputting an initial state of the logical circuit or uniquely initializing the logical circuit, accumulating means for monitoring at least a portion of an input signal in synchronism with the system clock of the microprocessor and accumulating the input signal as an accumulated input signal and reproducing means for reproducing by a unit of the system clock an internal operation of a circuit in the system, an operation of which cannot be observed from outside by transmitting a history of the accumulated input signal.

According to another aspect of the present invention, there is provided the debugging system, further including an input signal monitoring mechanism where when a change of a memory is not conducted from a circuit other than the microprocessor, a content of a read data from the memory is excluded among accesses in the microprocessor and only access timings of the memory are monitored and accumulated. In this case, the input signal monitoring mechanism has a means for recording and accumulating only a content of change and time of a signal having a low frequency of the change.

According to another aspect of the present invention, there is provided the debugging system, further including when a synchronizing circuit operating in synchronism with other system clock other than the microprocessor is provided, means for monitoring and reproducing an input signal to the synchronizing circuit other than an input signal from outside to the microprocessor and means for reproducing both of the microprocessor and the synchronizing circuit, whereby monitoring of input and output signals between the microprocessor and the synchronizing circuit is omitted.

According to another aspect of the present invention, there is provided the debugging system, further including when an asynchronous circuit operating asynchronously with the system clock is provided, outputting means for separately outputting a signal transmitted from the asynchronous circuit to the logical circuit, means for accumulating an output signal from the outputting means as an input signal, and means for reproducing a coordinating operation with the asynchronous circuit by using the input signal.

According to another aspect of the present invention, there is provided the debugging system, further including when an asynchronous circuit operating asynchronously with the system clock is provided, first outputting means for outputting in synchronism with the clock only a handshake input signal from the asynchronous circuit among signals transmitted from the asynchronous circuit to the logical circuit, second outputting means for outputting a bus signal from the asynchronous circuit to a common bus of the microprocessor without synchronizing the bus signal, and means for reproducing a coordinating operation by reproducing an input from the asynchronous circuit to the logical circuit by using output signals from the first and the second outputting means.

According to another aspect of the present invention, there is provided the debugging system, wherein the microprocessor is provided with means for escaping an initial state of the system to a memory, further including means for observing and accumulating the input signals, means for reading the accumulated input signal, and means for reproducing an operation of the system by using the accumulated input signal.

According to another aspect of the present invention, there is provided the debugging system where a plurality of microprocessors are mounted, further including a common memory, a bridge to an external low speed synchronizing I/O bus, a high speed synchronizing bus for connecting the plurality of microprocessors, the common memory and the bridge and operating them in synchronism with the system clock, an I/O interface for carrying out a plurality of asynchronous operations, and a means used in a system for transmitting a signal to the bridge via the synchronizing bus by connecting the I/O interface to the external low speed synchronizing I/O bus for monitoring and accumulating only a signal reaching the bridge by being connected to the asynchronous I/O bus. In this case, the system is provided with reproducing means for reproducing the operation of the system by using an input signal where the operations of the microprocessor, the common memory and the I/O interface are accumulated and when a high speed synchronizing circuit is connected to the external I/O bus in the system, the system is provided with means for monitoring and accumulating an asynchronous input signal of the high speed synchronizing circuit and the reproducing means reproduces the operation of the high speed synchronizing circuit.

BRIEF DESCRIPTION OF THE DRAWINGS

FIG. 3 is a diagram showing states of signals transmitted by a debugging exclusive pin shown by FIG. 2;

FIG. 7 is a view schematically showing a software simulation model shown by FIG. 5;

DESCRIPTION OF THE PREFERRED EMBODIMENTS

Description will be made about the present invention in reference to the drawings hereinunder.

Figure 5:
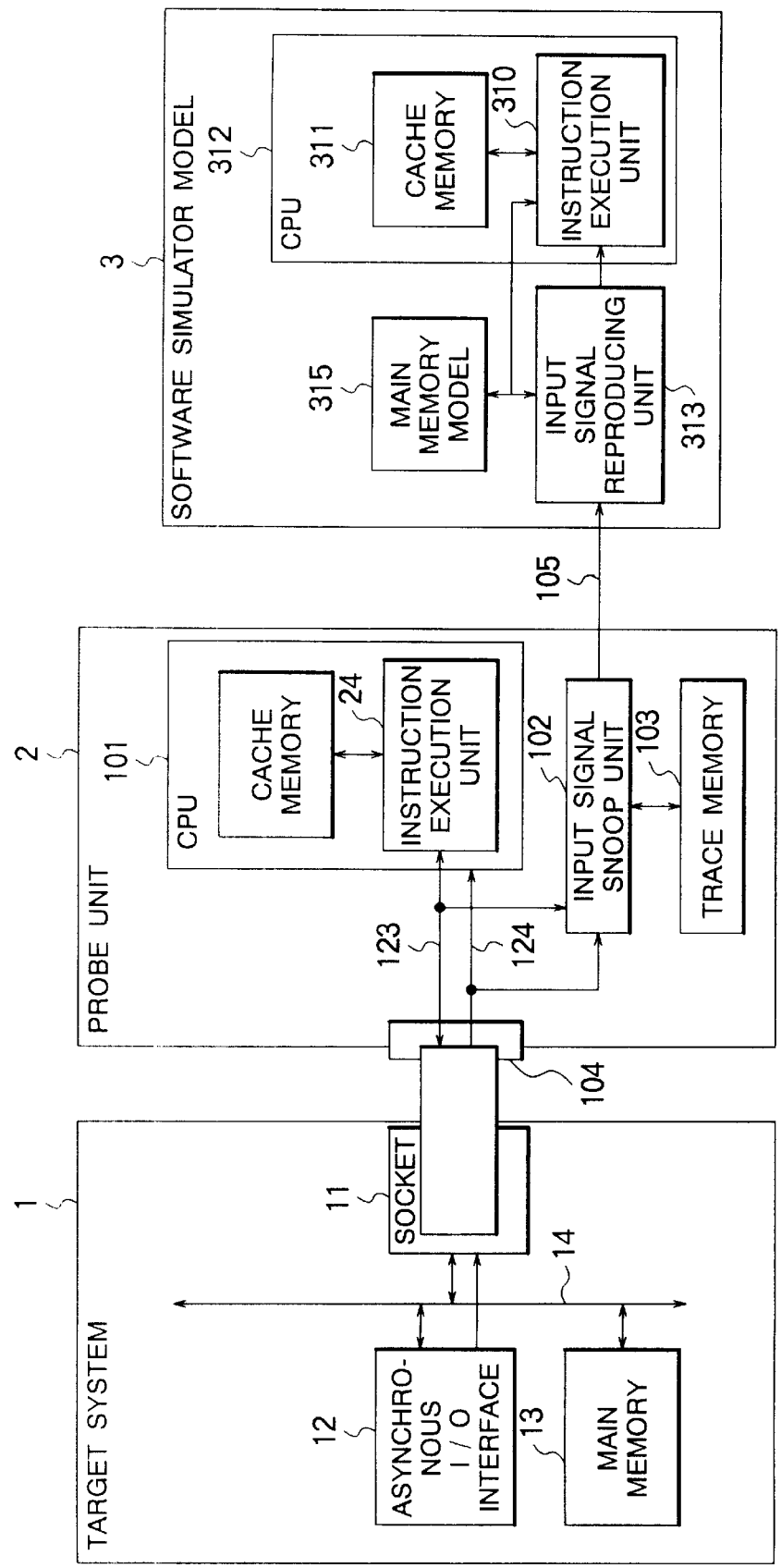
FIG. 5 is a view schematically showing a debugging system according to a first embodiment of the present invention.

In FIG. 5, a debugging system is formed by a target system 1, a probe unit 2, and a software simulator model 3. Herein, the target system 1 shows an object to be debugged by the software simulator model 3 while the software simulator model 3 carries out simulation on the basis of data signals sent from the probe unit 2. In this connection, the probe unit 2 is connected to both the target system 1 and the software simulator model 3.

In the illustrated example, the target system 1 is constituted by a processor, a socket 11 of the processor, an asynchronous I/O interface 12, a main memory 13 and the like. The I/O interface 12 and the memory 13 are connected to each other via a bus 14. The illustrated target system 1 is assumed to be synchronized with a single sequence of clock signal while the asynchronous I/O interface 12 serves to arbitrate between the synchronized portions and portions which are not synchronized with the clock signals. A probe 104 is connected to the socket 11 of the processor to transfer all of signals of terminals of the processor to the probe unit 2.

The probe unit 2 is constituted by a CPU 101 which conducts an operation similar to that of a CPU to be plugged into the socket 11, an input signal snoop unit 102 for monitoring input signals sent to the CPU 101 and a trace memory 103. The input signal snoop unit 102 transmits contents of the trace memory 103 to the software simulator 3 via a communication bus 105 in response to a request.

The software simulator 3 is provided with a CPU model 312, a main memory model 315, and an input signal reproducing unit 313 for reproducing input signals sent from the probe unit 2 on the software simulator model 2.

Herein, description will be successively made in detail about the target system 1, the probe unit 2, and the software simulator unit 3 illustrated in FIG. 5.

Target System 1:

(Asynchronous I/O interface 12)

The asynchronous I/O interface 12 is connected to the microprocessor (CPU) 101 through a bus of a clock synchronization type and is also operable in response to a signal which is asynchronous with the clock and which may be, for example, an interruption signal.

(Main memory 13)

The main memory 13 is operable in response to an access timing signal, a refreshing timing signal, and the like which are determined irrespective of the operation of the microprocessor 101. The main memory 13 produces a READY signal 125 representative of completion of a bus cycle and supplies the READY signal to the microprocessor 101.

In the illustrated example, contents of the main memory 13 are not changed freely by other means than a storage means for storing a signal from the bus 14. When values are changed, by means of DMA (Direct Memory Access) or the like, to the other values different from those sent from the microprocessor 101, a data bus 123 should be monitored even if the values are not supplied to the microprocessor 101.

Figure 6:
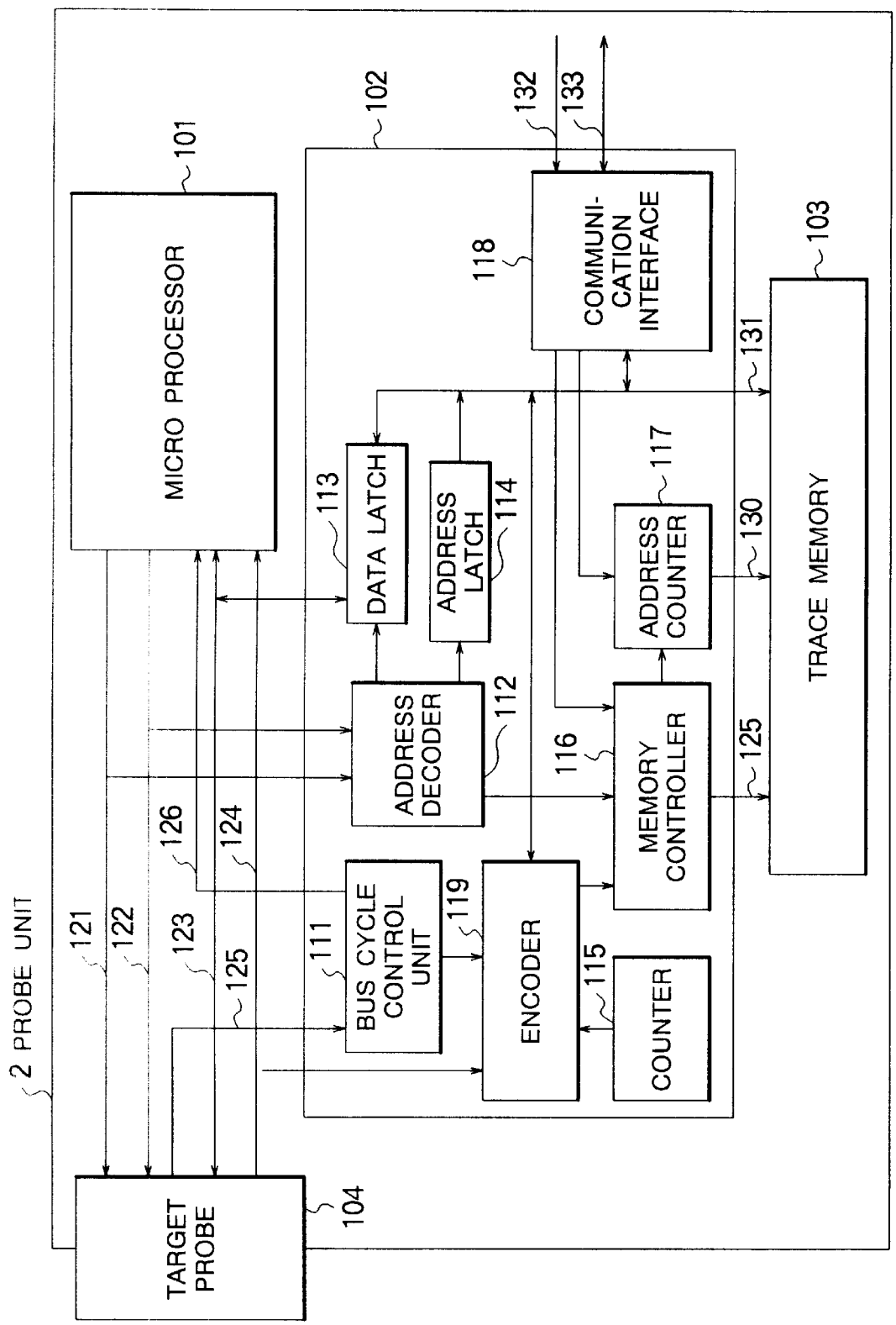
FIG. 6 is a view schematically showing a probe unit shown by FIG. 5.

Next, description will be directed to the probe unit 2 also with reference to FIGS. 5 and 6.

Probe Unit 2:

(Microprocessor (CPU) 101)

The microprocessor (CPU) 101 to be plugged in the socket 11 is operated in synchronism with the single sequence of the clock signals. The illustrated microprocessor 101 can supply all the internal states to an external device or can be reset by a predetermined command. This operation is helpful to avoid a state at which prediction by software becomes impossible when the operation is put into an undetermined situation due to occurrence of a tacit or quiescent state.

The probe unit 2 is plugged into the socket 11 of the target system 1 to be coupled with the microprocessor 101. Signals of the target system 1 are transmitted to the microprocessor 101 in the probe unit 2 while signals of the microprocessor 101 are sent to the target system 1 through the socket 11. In the illustrated example, the signals given to the microprocessor (CPU) 101 are also given to the input signal snoop unit 102.

(Input signal snoop unit 102)

The input signal snoop unit 102 is supplied with all of signals given to the microprocessor 101, signals from a data bus 123, interruption signals 124, and the READY signal 125. The signals from the data bus 123 and the interruption signals 124 are supplied to the input signal snoop unit 102 in parallel with the microprocessor 101. The bus cycle control READY signal 125 is at first given only to the probe unit and another READY signal 126 is separately formed and sent to the microprocessor 101 in FIG. 6.

The input signal snoop unit 102 reads an address signal 121 and a status signal 122 sent from the microprocessor 101 to supply the address to an address latch 114 and to supply control signals to a data latch 113 and a memory controller 116. The READY signal 125 is sent to a bus cycle control unit 111 and contents of the READY signal 125 is transmitted to an encoder 119 while the READY signal 126 is delivered to the microprocessor 101.

The encoder 119 successively encodes the interruption signal 124 and the READY signal 123 in time sequence and supplies them to an internal data bus.

In the probe unit 2 illustrated in FIG. 6, the encoder 119, the data latch 113, the address latch 114, and a communication interface 118 are connected to the internal data bus. The memory controller 116 mediates or arbitrates requests from an address decoder 112, the encoder 119, and the communication interface 118 and supplies a read/write control signal 125 to the trace memory 103 and a request signal to an address counter 117.

The address counter 117 increments an address 130 given to the trace memory 103 in response to the request from the memory controller 116. Alternatively, the address counter 117 may reset or set the address 130 in response to the request from the communication interface 118. A data bus 131 connected to the trace memory 103 is connected to the internal data bus.

(Operation of the input signal snoop unit 102)

Herein, it is to be noted that the microprocessor (CPU) 101 which includes a cache memory is given, as input signals, the following five signals.

(1) Input data signals 123 sent from the main memory 13

(2) READY signals 125 indicative of a finishing timing of the memory access operation (3) Input data signals 123 sent from the asynchronous I/O interface 12

(4) READY signals 125 indicative of a finishing timing from the asynchronous I/O interface 12

(5) Asynchronous interruption signals 124 given from an outer periphery and representative of interruption or the like.

With respect to the input data signals (1) from the main memory, only timings thereof may be stored if it is guaranteed that the contents are read out of the main memory 13 and are the same as the contents written into the main memory 13. However, when a DMA access or the like from an external periphery I/O interface without intervention of the CPU appears as the memory access, an exceptional operation is carried out. In this case, memory write data signals which appear in accordance with the DMA or the like and which has an address must be separately stored as an event in the trace memory 103.

Herein, it is noted that the external I/O interface can not estimate input data signals from output data signals sent from the CPU and, therefore, the output data signals should be monitored.

Within the I/O bus cycle in the case of (3), the address decoder 112 stores the signals from the data bus 123 into the data latch 113 and the contents of the signals from the address bus 121 into the address latch 114, transmits the time measured by the counter 115 to the encoder 119 and supplies them to the trace memory 103 after acquisition of a right by the mediation of the memory control 116. In the case of (2) or (4), the address decoder 112 detects the READY signal 125, encodes the signals by the encoder 119, and supplies the signals to the trace memory 103 after similar acquisition of a right by the mediation of the memory control 116 along with the time measured by the counter 115. In the case of (5), the address decoder 112 encodes the signals by the encoder 119 also and similarly supplies the signals to the trace memory 103.

The address counter 117 is incremented at every time when the signals are written into the trace memory 103 and can continue a trace operation for a time period corresponding to a capacity of the trace memory 103.

The communication interface 118 receives a request 132 from a host, such as the software simulator model 3 or the like, acquires a control right concerned with the memory controller 116, directly transmits an address from a communication bus 133 to the address counter 117, reads accumulated data signals from the trace memory 103 with an address designated, and transmits the data signals to the host via the communication bus 133.

Further, the input signal snoop unit 102 can read and write the contents of the trace memory 103 when it is accessed by a specific I/O address from the microprocessor 101.

(Contents of trace memory 103)

FIG. 7 shows an example of the contents of the trace memory 103. Input signals to the microprocessor 101 are encoded by the following manner and stored into the trace memory 103 in the manner illustrated in FIG. 7.

Event: An event is made to correspond in accordance with species of signals. Each signal is encoded into an encoded signal which is suitable for the species of the signals and which is written as PROPERTY. The species of events are shown as follows.

READY: Contents of the memory access READY signal 125

INT: Contents of the interruption signal 125

I/O read: Address and data read from I/O interface

Further description will be made in connection with FIG. 7.

time: Time of an event which is represented by a clock unit and which lasts from start of trace property: Detailed contents of each event. Meanings thereof differs from one another depending on events.

It is predicted that the frequency of change of bits is high with respect to the READY signal 125 and therefore, sixteen (16) clocks thereof are stored as property in the form of bit series by the encoder 119. At the same time, a code indicating the READY signal is written to the item of an event and the system clock time in starting the bit series is written to the item of time. It is predicted that the frequency of change of bits is low with respect to the interruption signal 124 and accordingly, the signal is encoded along with information of which one is effective among a plurality of the signals at respective times of ON/OFF and is written to property of the trace memory 103. At the same time, a code showing a change of the interruption signal is written to the item of event and the system clock time of the change of the interruption signal is written to the item of time. The data of the I/O read bus cycle 125 is also stored to property of the trace memory 103. In the case of the example shown by FIG. 5, data signals consist of 16 bits. At the same time, a code showing I/O read is written to the item of event and the system clock time of finishing I/O read is written to the item of time.

(Structure of the software simulator model 3)

Figure 8:
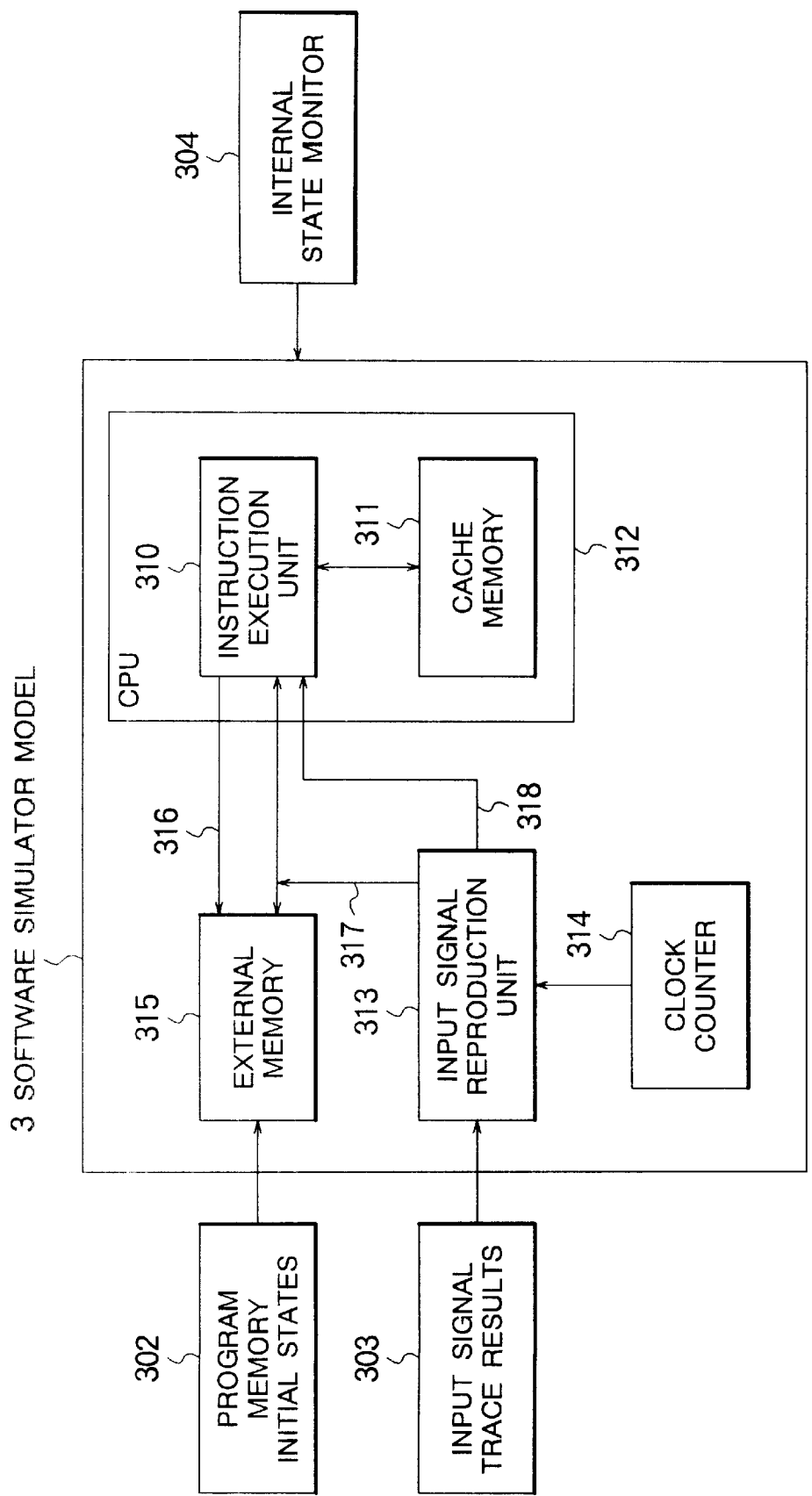
FIG. 8 is a view schematically showing another example of a probe unit according to the present invention.

The software simulator model 3 illustrated in FIG. 8 is constituted like in FIG. 5 by the CPU 310 which includes the cash memory 311, the external memory 315 and the input signal reproduction unit 313. The CPU 312 further has an instruction execution unit 312. The CPU 310 and the memory 315 are connected to each other through a bus 316 to transmit an address control signal from the CPU 310 to the external memory 315. In addition, the CPU 310, the external memory 315, and the input signal reproduction 313 are connected to one another via a data bus 317 which serves to transmit bidirectional signals. Besides, a signal 317, such as an interruption signal, is also directly transmitted through the data bus 317 from the input signal reproduction unit 313 to the CPU 312.

Figure 1:
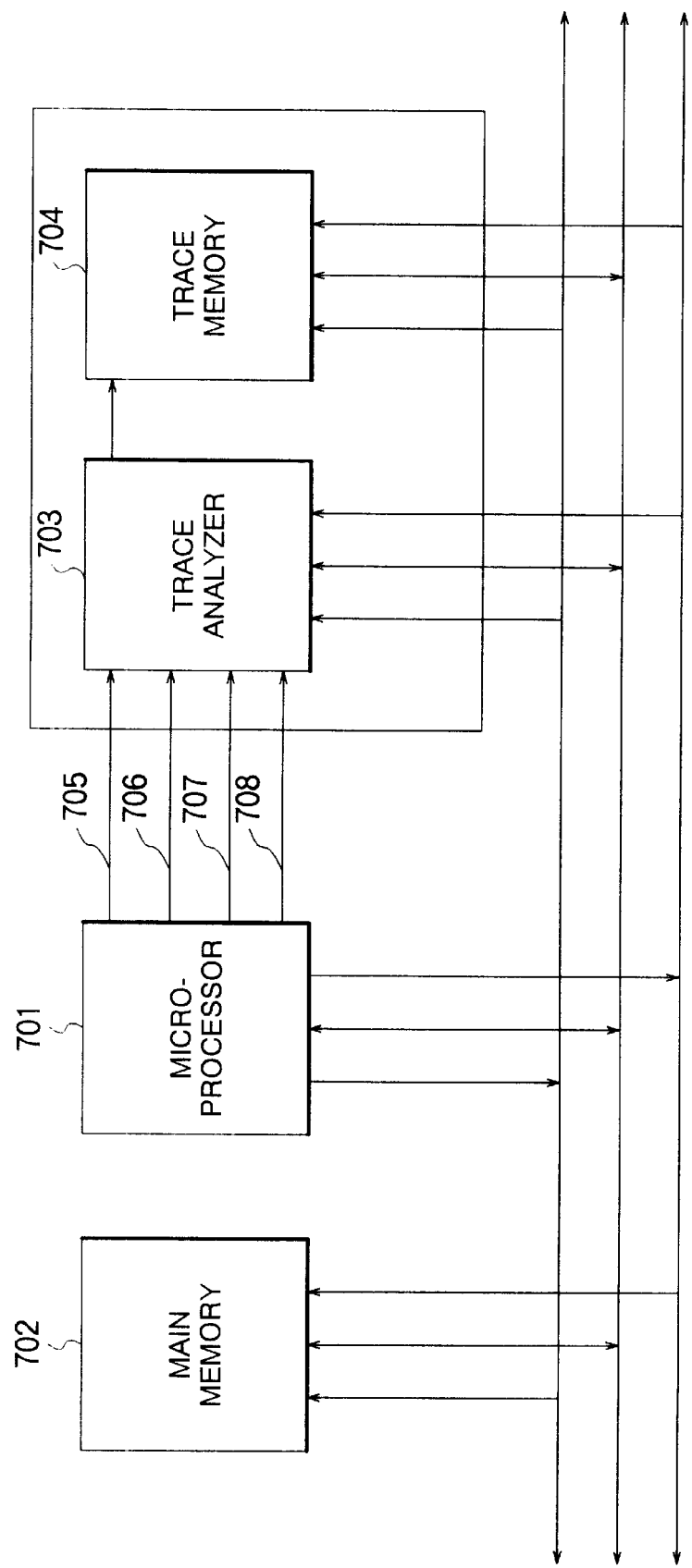
FIG. 1 is a view schematically showing a first example of a conventional debugging system.
Figure 2:
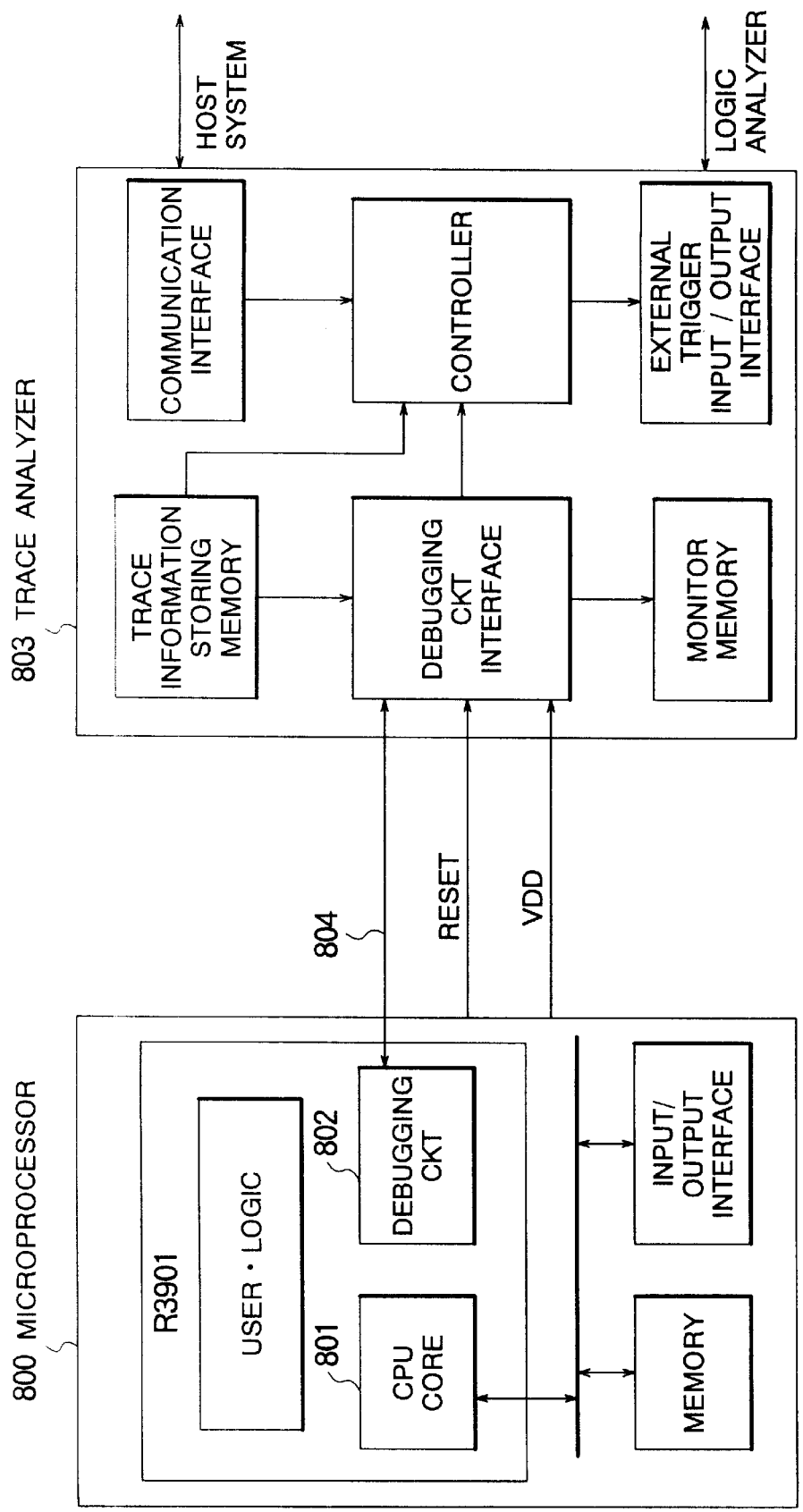
FIG. 2 is a view schematically showing a second example of a conventional debugging system.
Figure 4:
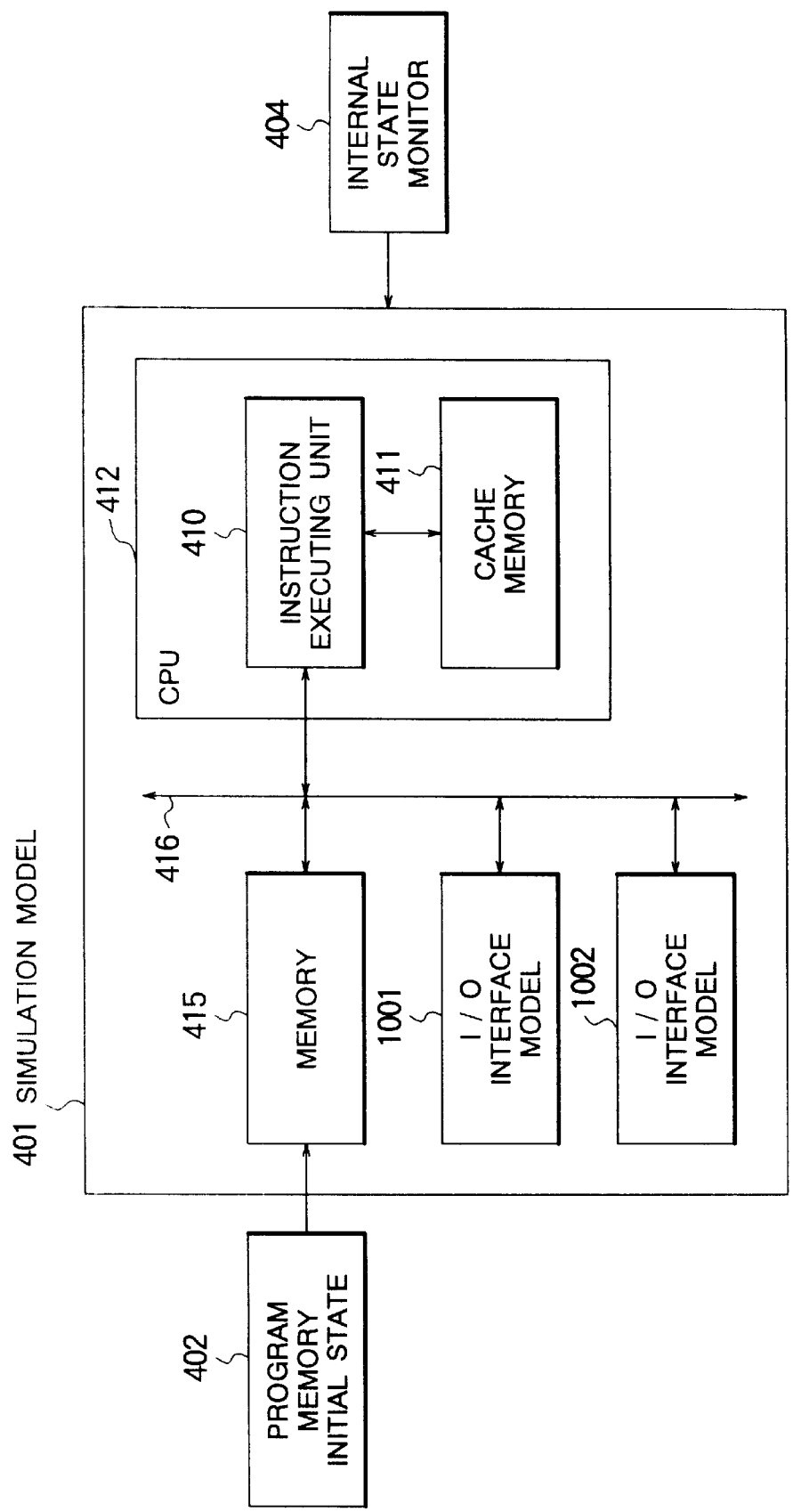
FIG. 4 is a view schematically showing a conventional software simulation model.

Differing from Conventional Example shown by FIG. 4, the illustrated software simulator model 3 is not internally provided with the I/O interface models 1001 and 1002. With this structure, the software simulation is carried out by using input signal trace results 303 that are captured from the target system 1. The software simulator model 3 is advantageous in comparison with the Conventional Example 3 in that it dispenses with the I/O interface models 1001 and 1002 (FIG. 4) which have a difficulty in connection with complete adjustment of operations and that phenomena actually caused to occur in the target system can completely be reproduced or regenerated in the illustrated structure.

(Input signal reproduction unit 313)

The input signal reproduction unit 313 is given all of the contents of the trace memory 103 captured by the probe unit 2. Under the circumstances, the simulation is started by the software simulation model 3.

As a start of the simulation, a clock counter 314 is initialized into 0 and is counted by each clock signal. In consequence, the value or the count of the clock counter 314 is incremented with a lapse of the simulation time. At first, at a time instant at which the count of the clock counter 314 is coincident with a time stored in the initial line of the item "time" in the trace results shown in FIG. 7, the input signal reproduction unit 313 accesses the item "event" and changes an output signal in accordance with the item "event".

Let the event specify the READY signal. In this case, the value indicated by the item "property" is shifted by one bit and is successively given from a most significant bit for a time period of 16 clocks.

When the event indicates the I/O Read, the corresponding data signals are given to the data bus. Each data signal is limited to 16 bits in this example. In the case of INT, the corresponding INT signal is changed.

From this fact, it is understood that, in the input signal reproduction unit 313, the input signals are determined depending on the system clock time without confirmation of output signals sent from the CPU 101 or the like.

(Procedure of debugging)

A user can carry out debugging in accordance with the following procedure.

1. The operation of the target system 1 is stopped and all the initial values are transmitted to the software simulator model 3.

2. When the operation is started in the target system 1, the input signal snoop unit 102 starts tracing input signals.

3. The operation of the input signal snoop unit 2 is stopped when an event, such as malfunction, occurs.

4. All of the hysteresis kept in the trace memory 103 until that time point is transmitted to the host or the software simulator model 3.

5. All of the circuits in the software simulator model 3 are initialized by the use of the initial values which have been sent initially.

6. The software simulator model 3 is operated at every system clock.

7. Hysteresis information kept in the trace memory 103 is decoded to be inputted at every system clock.

All the internal operations of the microprocessor 101 can be reproduced over a whole time from commencement of transmission of the initial values to a stop of the tracing operation in the above-mentioned manner. The reason why the operation of the microprocessor 101 can be completely reproduced in the above-mentioned manner is because the microprocessor is basically operated in synchronism with clocks given from an external device and can predict output values decisively in response to the input signals synchronized. Accordingly, the software simulator model 3 is different from the Conventional Example 2 in view of the fact that it is possible to observe not only the execution order of instructions carried out until occurrence of malfunction and a state of occurrence of the malfunction but also all the internal states of the microprocessor 101 occurring before the occurrence of the malfunction.

Figure 9:
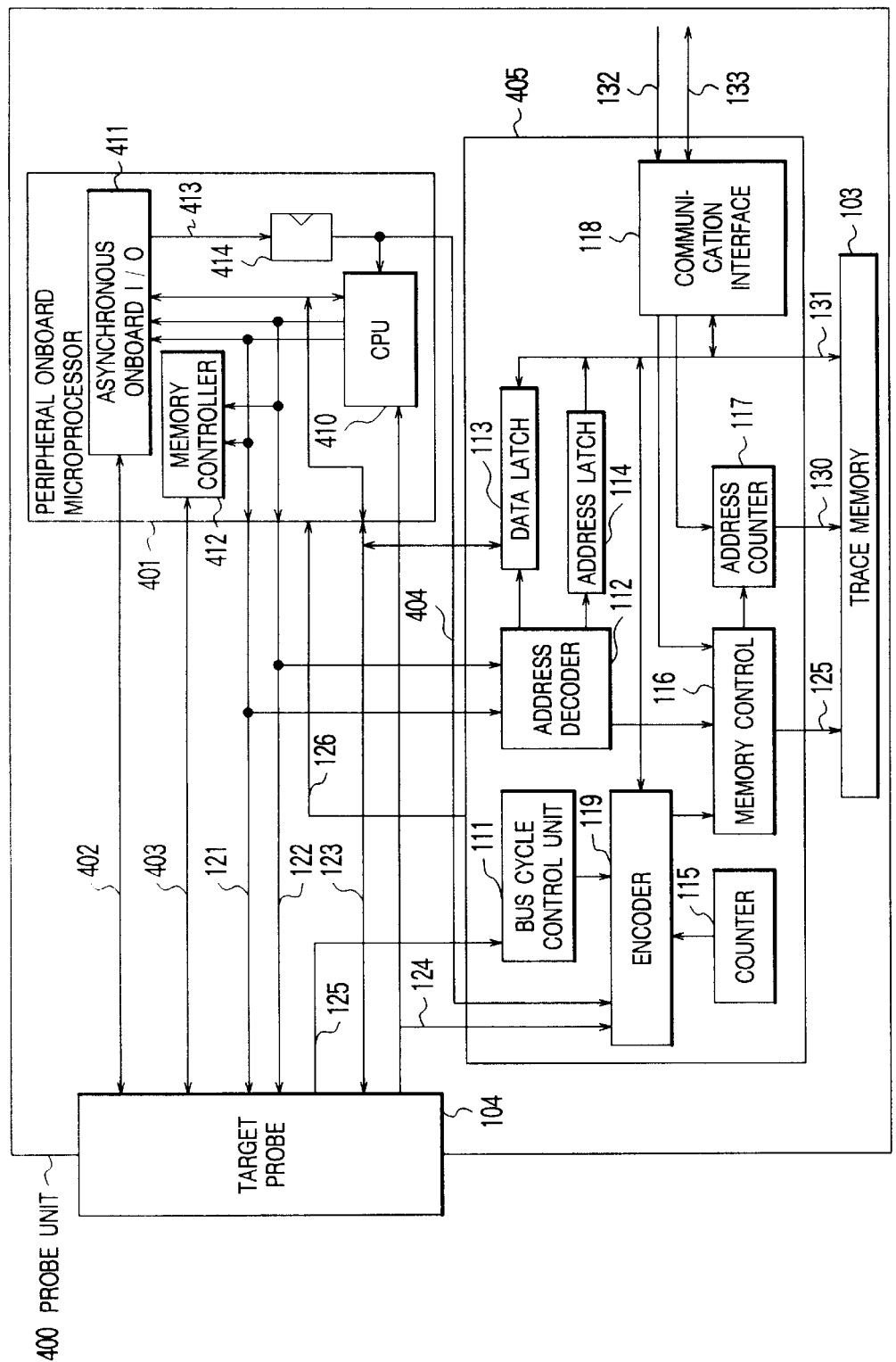
FIG. 9 is a view schematically showing an example of a target system shown by FIG. 5.

Referring to FIG. 9, a probe unit 400 according to another example is illustrated and is a modification of the probe unit shown in FIG. 6.

In addition to the CPU 410 which corresponds to the microprocessor 101 shown by FIG. 5, a peripheral onboard microprocessor 401 includes an asynchronous onboard I/O 411 operated asynchronously with a sequence of clock signals and a memory controller 412 operated in synchronism with a sequence of system clocks. In this event, signals 413 from the asynchronous onboard I/O 411 are given to the CPU 410 after they are synchronized with the clock signals by the use of a latch 414. The signals are supplied to an outside in the form of synchronized signals 404. When the asynchronous onboard I/O 411 is accessed from CPU 410, signals are sent from the asynchronous onboard I/O 411 through the external buses 121, 122 and 123 in synchronism with internal signals.

With this structure, it is unnecessary to receive the READY signal 125 from outside since the memory controller 412 is included in the peripheral onboard microprocessor 401. This is different from the example shown by FIG. 5.

The illustrated input signal snoop unit 405 is also different in structure from that illustrated in FIG. 5. Specifically, the input signal snoop unit 405 is supplied with asynchronous input signal 404 from the peripheral onboard processor 401 as an internal signal in a manner similar to the interruption signal 124.

The memory controller 412 can reproduce behavior carried out at every clock in relation to the READY signal by forming a simulation model which includes a synchronizing circuit. In this case, the synchronizing circuit may carry out, in synchronism with the clocks, a refresh operation which is indispensable in a DRAM. With this structure, omission may be made about input snoop of the READY signal related to memory.

(Difference between the probe unit 400 illustrated in FIG. 9 and the probe unit 2 illustrated in FIG. 5)

Differing from the probe unit 2 shown in FIG. 5, the probe unit 400 includes the peripheral onboard microprocessor 401 which is formed by the memory controller unit 412 operated in synchronism with the clock of the CPU 410 and the onboard I/O 411 operated asynchronously, as mentioned before.

In addition, the software simulation model 3 is operated in synchronism with the system clock and, therefore, the operation can decisively be predicted without being influenced by a variation, such as temperature, in the circuits.

Therefore, the memory controller 412 can decisively predict the operation by forming the simulation model of the memory controller 412 without monitoring input signals from the memory controller 412 to the CPU 410.

On the other hand, the asynchronous onboard I/O 411 can not predict operation only by externally observing, at every system clock, the input signal 402 of the peripheral onboard microprocessor 401. This means that timings of output signals from the asynchronous onboard I/O 411 to the CPU 410 can not be predicted and that all of input signals from the CPU 410 can not be observed. Therefore, reproduction of the operation of the CPU 410 can not be performed only by the method explained in reference to FIG. 5.

However, even if the reproduction of the asynchronous circuit 411 cannot be carried out by the use of the clock signals, reproduction of the operation of the CPU 410 can be performed in a manner to be described hereinunder. Specifically, operation of the asynchronous circuit is put into an undetermined state when the synchronizing circuit given the signals is rendered into an undecisive behavior because of a variation of timings supplied to the synchronizing circuit operable in response to the asynchronous signal.

Taking the above into consideration, a hysteresis of the timings is obtained by processing the asynchronous signals in a synchronous manner and is stored separately. In this manner, the behavior of the synchronizing circuit operable in response to the asynchronous signals can decisively be predicted.

Accordingly, in this example, the synchronizing signal 404 is separately outputted while a timing of synchronization from the asynchronous onboard I/O 411 to the onboard CPU 410 is outputted to the outside. In this connection, the illustrated input signal snoop unit 405 includes a circuit for observing the timings of the synchronizing signals 404. This structure makes it possible to completely monitor the operation of the CPU 410 from the outside of the peripheral microprocessor 401.

Further, when a peripheral onboard processor includes a synchronizing circuit which has a large amount of input and output signals in such DMA or the like, signals from DMA to CPU can be predicted by simulation by forming a simulation model of DMA and capturing input signals to DMA. Accordingly, an amount of input signals to be observed can significantly be reduced. Incidentally, although description has been made only about the peripheral onboard processor, the present invention is applicable to the case where the peripheral I/O of the synchronizing circuit and the memory controller are arranged as an external circuit located outside of the microprocessor. In this event, an input signal snoop unit and a peripheral circuit model may be formed in connection with the external circuit and the synchronizing timings of asynchronous signals may be monitored. Thus, it is possible to also reproduce the peripheral circuit located outside of the microprocessor.

Figure 10:
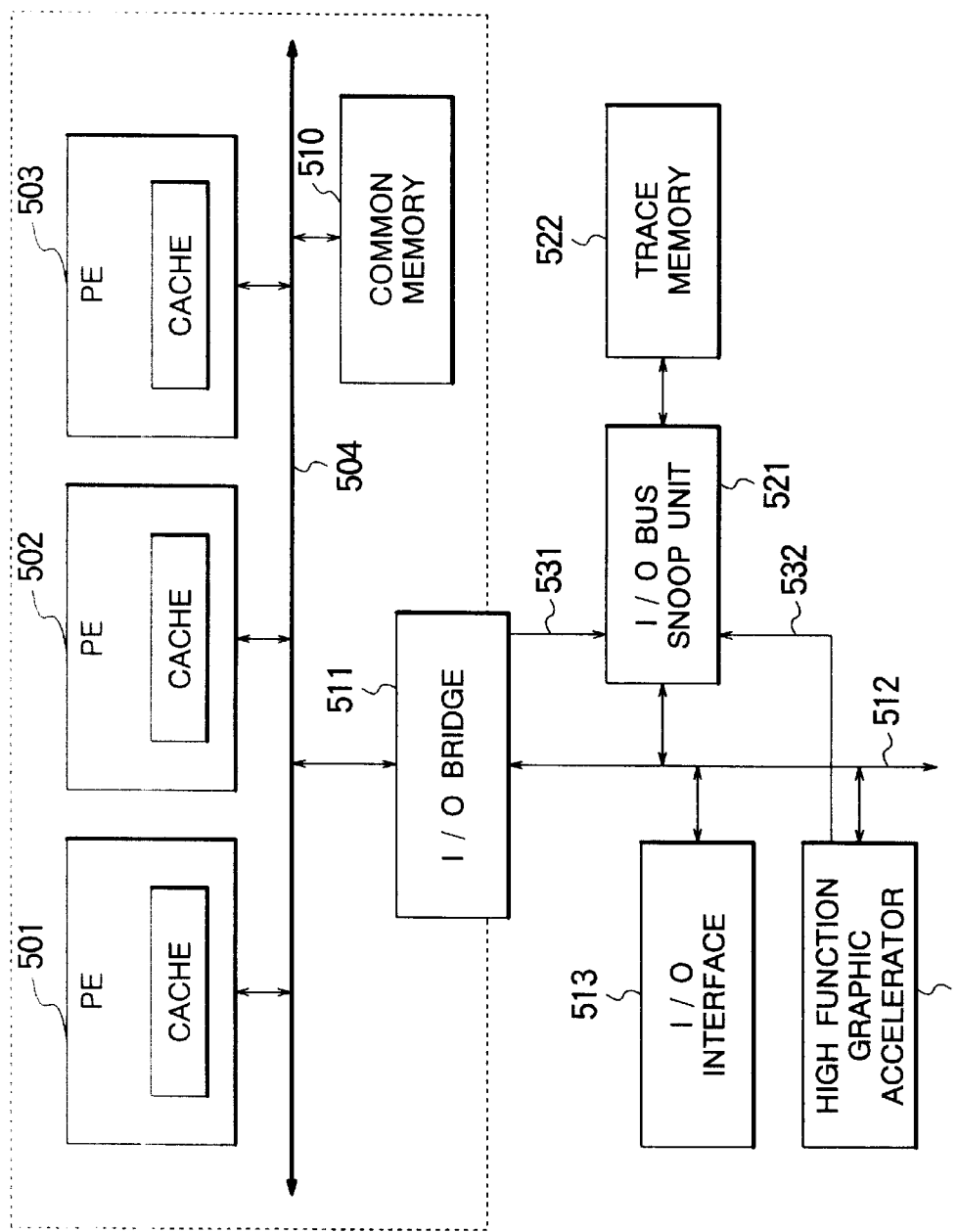
FIG. 10 is a view showing an example of contents of a trace memory shown by FIG. 5.

Referring to FIG. 10, a debugging system according to another embodiment of this invention comprises a plurality of microprocessors 501, 502, and 503 each of which includes a cache memory are connected to one another through a high speed bus 504 operable in synchronism with a sequence of clock signals. In the illustrated example, a common memory 510 and an I/O bridge 511 are also connected to the high speed bus 504. The illustrated I/O bridge 511 is connected to a low speed bus 512 which is also connected to an I/O interface 513 and a graphic accelerator 514. The I/O interface 513 is operable asynchronously with a sequence of clocks while the the graphic accelerator 514 includes a portion operable asynchronously with the clocks and can carry out a high speed operation.

Moreover, an I/O bus snoop unit 521 is connected to the low speed bus 512 and is operable to snoop and store read cycles sent from the I/O interface 513 and the graphic accelerator 514. Simultaneously, the I/O bus snoop unit 521 receives signals 531 obtained by synchronizing an interruption signal given to the I/O bridge 511 and stores them into a trace memory 522.

Further, this system has software models which are models of the microprocessors 501 through 503, the common memory 510 and the I/O bridge 511 and which are located in the microprocessor 501.

Description will be made about operation of the illustrated debugging system.

1. Initial states of the microprocessor 501 and the common memory 510 are individually stored in separate portions.

2. In a manner similar to the above-described embodiments, the I/O bus snoop unit 521 makes the trace memory 522 store the hysteresis.

3. The storage of the hysteresis is stopped at a time point at which malfunction or disorder takes place. In this situation, the microprocessor 501 reads contents out of the trace memory 522.

4. The operation of the microprocessor 501 or the like is reproduced by utilizing the initial states and the hysteresis by driving the software simulator model.

Herein, consideration will be made, as an application example, about the case where the graphic accelerator 514 is operated in synchronism with the system clock and a large amount of write-in data signals are sent from the graphic accelerator 514 to the I/O bridge 501.

In this case, all of synchronized input signals 533 are sent from the graphic accelerator 514 to the I/O bus snoop unit 521 and stored in the I/O bus snoop unit 521. Further, when a software model of the graphic accelerator 514 is formed and added to the models of the system, the simulation is carried out together with the added model and the other models. According to this simulation, the contents of bus communication with respect to the graphic accelerator 514 can be predicted and, therefore, the snooping operation may not be carried out. This results in a reduction of an amount of accumulating I/O bus signals stored to the trace memory 522.

Figure 11:
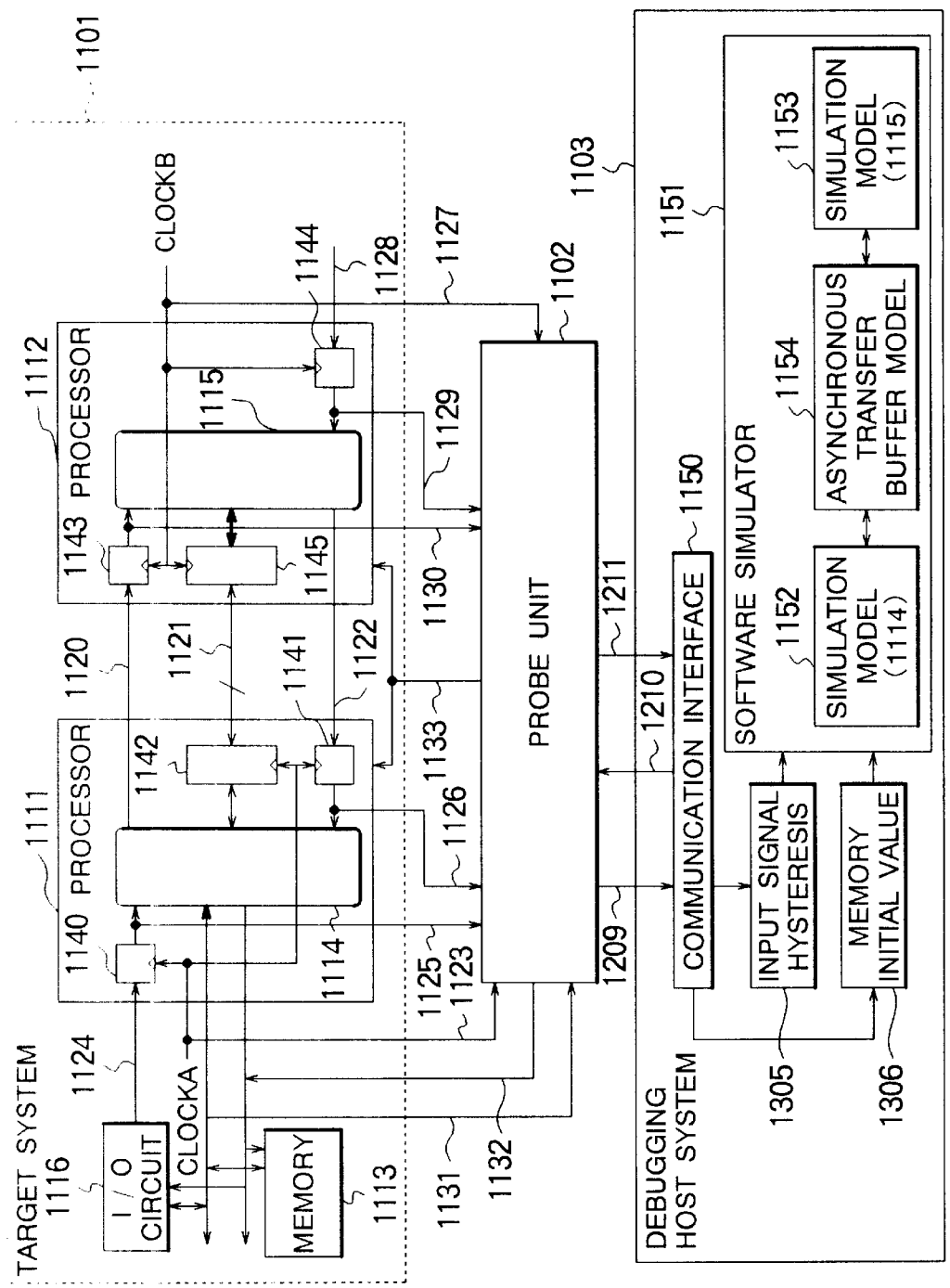
FIG. 11 is a view schematically showing a debugging system according to a second embodiment of the present invention.

Referring to FIG. 11, a debugging system according to another embodiment of the present invention.

In FIG. 11, the illustrated debugging system has a target system 1101 as an object system for observing the operation.

A probe unit 1102 monitors the operation of the target system 1101 and transmits contents of monitoring to a debugging host system, namely, a software simulator model 1103.

The target system 1101 is constituted by a processor 1111, a processor 1112, a external memory 1113, clock signal generating elements, an I/O circuit 1116, and the like. In the example illustrated, the processor 1111 and the processor 1112 are operated in synchronism with different clocks.

In FIG. 11, the processor 1111 is connected to an asynchronous bus 1121, the external memory 1113, and a control signal bus 1132, and a data bus 1131 and is operable in response to an asynchronous signal 1122, an asynchronous signal 1124, and a clock signal 1123. The asynchronous signal 1124 is given from the external I/O 1116.

Among the asynchronous inputs to the processor 1111, the asynchronous signal 1124 and the transmission request signal 1122 from the processor 1112 are each synchronized by the clocks 1123 and serve to produce a signal 1126 and a signal 1125.

These signals are outputted to the outside of a chip to be tested. All internal circuits 1114 of the processor 1111 are operated in synchronism with the clock signal 1123. With this structure, their behavior can uniquely be reproduced from the initial values and the input signals at once.

On the other hand, the processor 1112 is connected to the asynchronous bus 1121 and is operable in response to an asynchronous signal 1120, an asynchronous signal 1128, and the clock signal 1127. The asynchronous signal 1128 is given from the external I/O in a manner similar to the previous embodiment. Herein, it is to be noted in this embodiment that no external memory is connected to the processor 1112. Among the asynchronous inputs given to the processor 1112, the asynchronous signal 1128 and the transmission request signal 1120 from the processor 1111 are each synchronized by the clock 1127 whereby a signal 1129 and a signal 1130 are produced. These signals are delivered outside of a chip and are tested. All of internal circuits 1115 of the processor are synchronized by the clock signal 1127 and behavior thereof can uniquely be reproduced from initial values and input signals.

The probe unit 1102 is operable in response to the signals which supplied from the target system 1101 and which will be enumerated hereinunder.

1. the signal 1125 and the signal 1126 which are output signals synchronized from the processor 1111.

2. the clock 1123 which is also given to the processor 1111.

3. the signal 1129 and the signal 1130 which are output signals synchronized from the processor 1112.

4. the clock 1127 which is also given to the processor 1112.

5. the control signal 1132 and the data signal 1131 which serve as interface signals of the processor 1111 and the external memory 1113 located outside of the processor 1111.

To the contrary, the probe unit 1102 gives the following signals to the target system 1101.

1. A reset signal 1133 which resets both of the processor 1111 and the processor 1112.

2. The control signal 1132 which serves an an interface signal between the processor 1111 and the external memory 1113 and which is used for the purpose of reading an initial state.

Furthermore, the illustrated debugging host system 1103 includes an interface 1150 for communicating with the probe unit 1102 and a software simulator 1151.

The software simulator 1151 is constituted by a simulation model 1152 which mainly corresponds to the internal circuits 1114 of the processor 1111, a simulation model 1153 which corresponds to the internal circuits 1115 of the processor 1112, and an asynchronous transmission buffer model 1154 which corresponds to the asynchronous bus 1121 and transmission latches 1142 and 1146 for mutual transmission. The software simulator 1151 is operated in response to an input signal hysteresis 1305 and a memory initial value 1306 both of which are given from the communication interface 1150.

Figure 12:
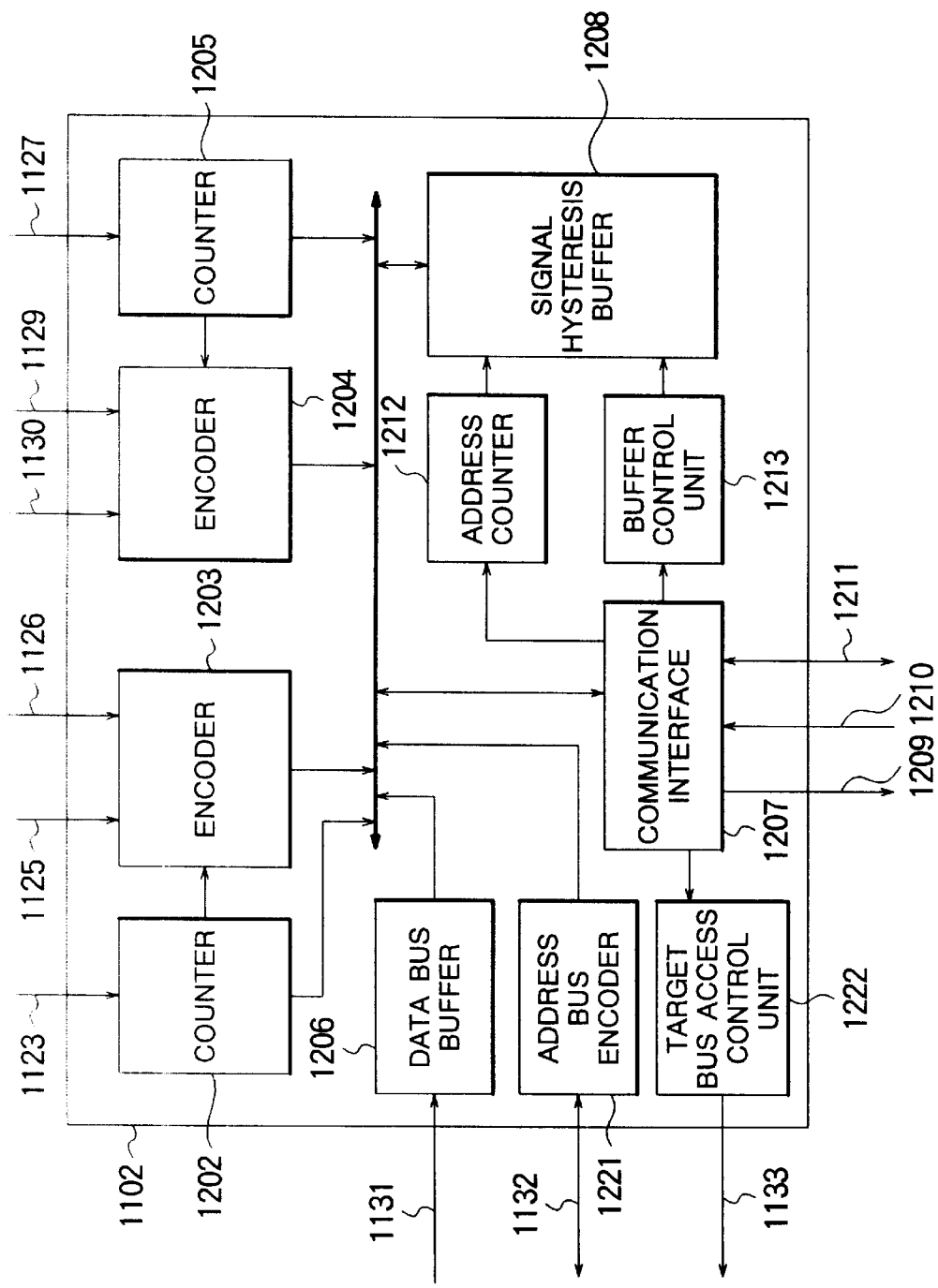
FIG. 12 is a view schematically showing the structure of a probe unit 1102 of FIG. 11.

FIG. 12 shows an internal structure of the probe unit 1102.

An output signal from the processor 1111 is timed by the clock 1123 generated by the counter of the processor 1111 to record a time instant of the output signal. The time instant is stored in an internal buffer after it is encoded. An output signal from the probe unit, namely, the processor 1112 is timed by the counter which uses the clock 1127 of the probe unit 1112 to record a time instant of the output signal. The time instant is stored in an internal buffer after it is encoded.

Further, a control circuit is provided to read the memory 1113 connected to the processor 1111.

At a time instant at which either of the counter of the clock 1123 and the counter of the clock 1127 becomes full, a buffer flash request signal 1209 is supplied to the debugging host system 1103. The debugging host system 1103 issues a buffer transmission request 1210 by using the communication interface 1150 and all of contents of the buffer is received from a data bus 1211 and are recorded in the debugging host system 1103.

Figure 13:
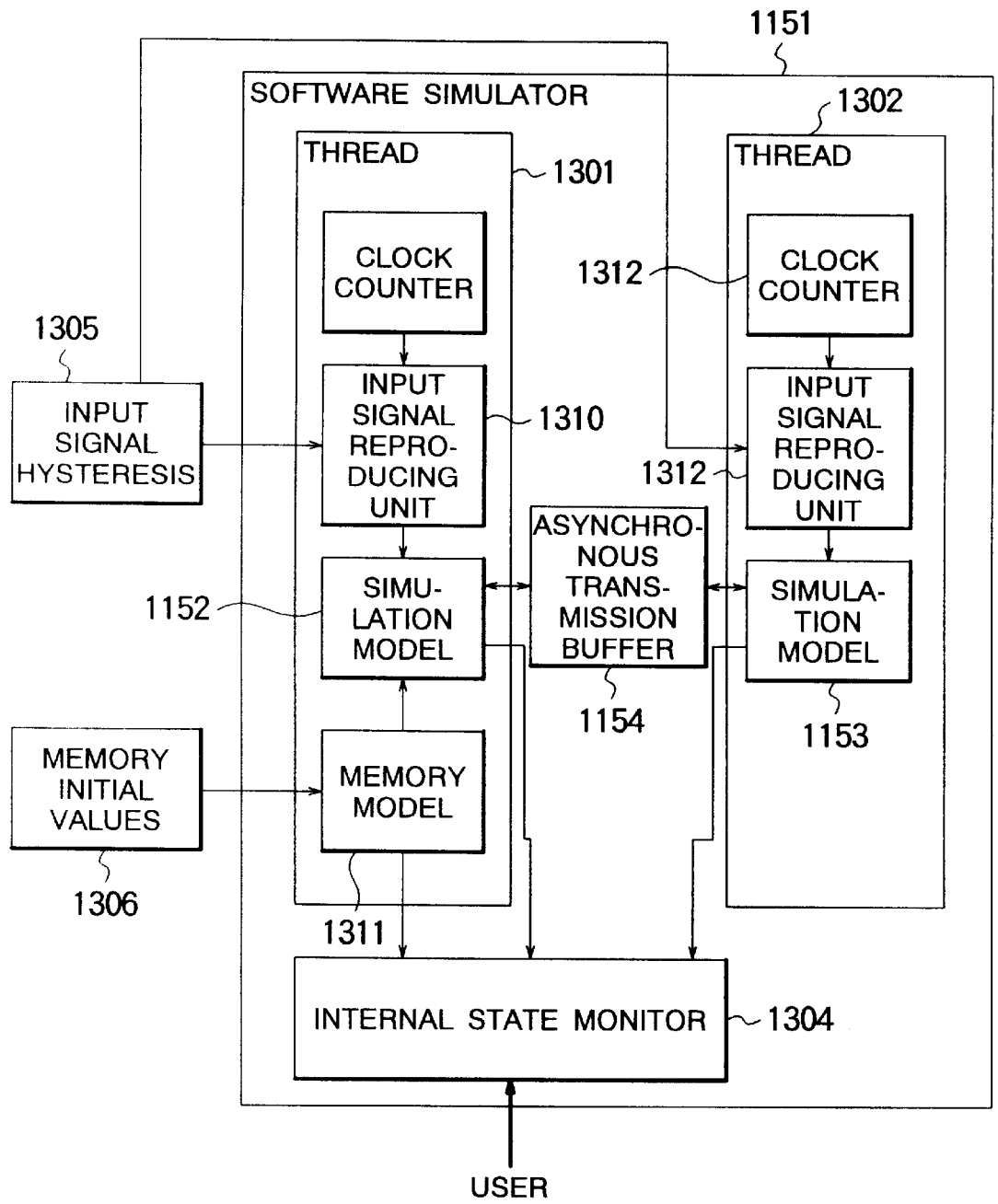
FIG. 13 is a view schematically showing a software simulator 1151 of FIG. 11.

FIG. 13 shows the internal structure of the software simulator 1151 in detail. The input signal hysteresis 1305 and the memory initial values 1306 are given as the data signals from the target system to the software simulator 1151 via the probe unit 1112 and the communication interface 1150. An input signal reproducing module 1310, a memory model 1311 and an asynchronous transmission bus module 1303 are connected to the model 1152 of the processor 1111.

Although an input signal reproducing module 1312 and an asynchronous transmission bus module 1303 are connected to the model 1153 of the processor 1112, a memory is not connected to the model 1153 like in the processor 1112.

The respective processors are operated independently of each other in view of timing except in a synchronized state and therefore, it is preferable to mount them by the use of a function of synchronization and a multi-thread structure. By sharing a state of a multi-thread structure, sharing of a state of a memory, a transmission signal or the like is realized by synchronization. A thread 1301 in the embodiment is a simulation model operated by the clock of the processor 1111 and a thread 1302 constitutes a simulation model operated by the clock of the processor 1112. Further, transmission timings are made to coincide with actual operations by the synchronization function. The input signal reproducing module 1310 reproduces an input signal in accordance with a simulation time of the processor 1111. The signal is outputted to the simulation model 1152 of the processor 1111.

According to the input signal reproducing module 1312 of the processor B model 1153, reproduction is conducted in accordance with a simulation time counted by the clock of the processor B(1112). The signal is outputted to the simulation model 1153 of the processor 1112.

The mutual transmission is conducted by using the asynchronous transmission bus 1303. This means that operation is carried out by the use of a synchronization variable between the threads.

(Procedure of debugging)

A user carries out debugging in accordance with the following procedure.

1. The target system is initialized.
2. The internal states of the processor 1111, the processor 1112 and the memory 1113 are maintained and transmitted to the software simulator 1151.
3. Signals are monitored after the system is operated.
4. Monitoring the operation is started due to simulation.

Figure 14:
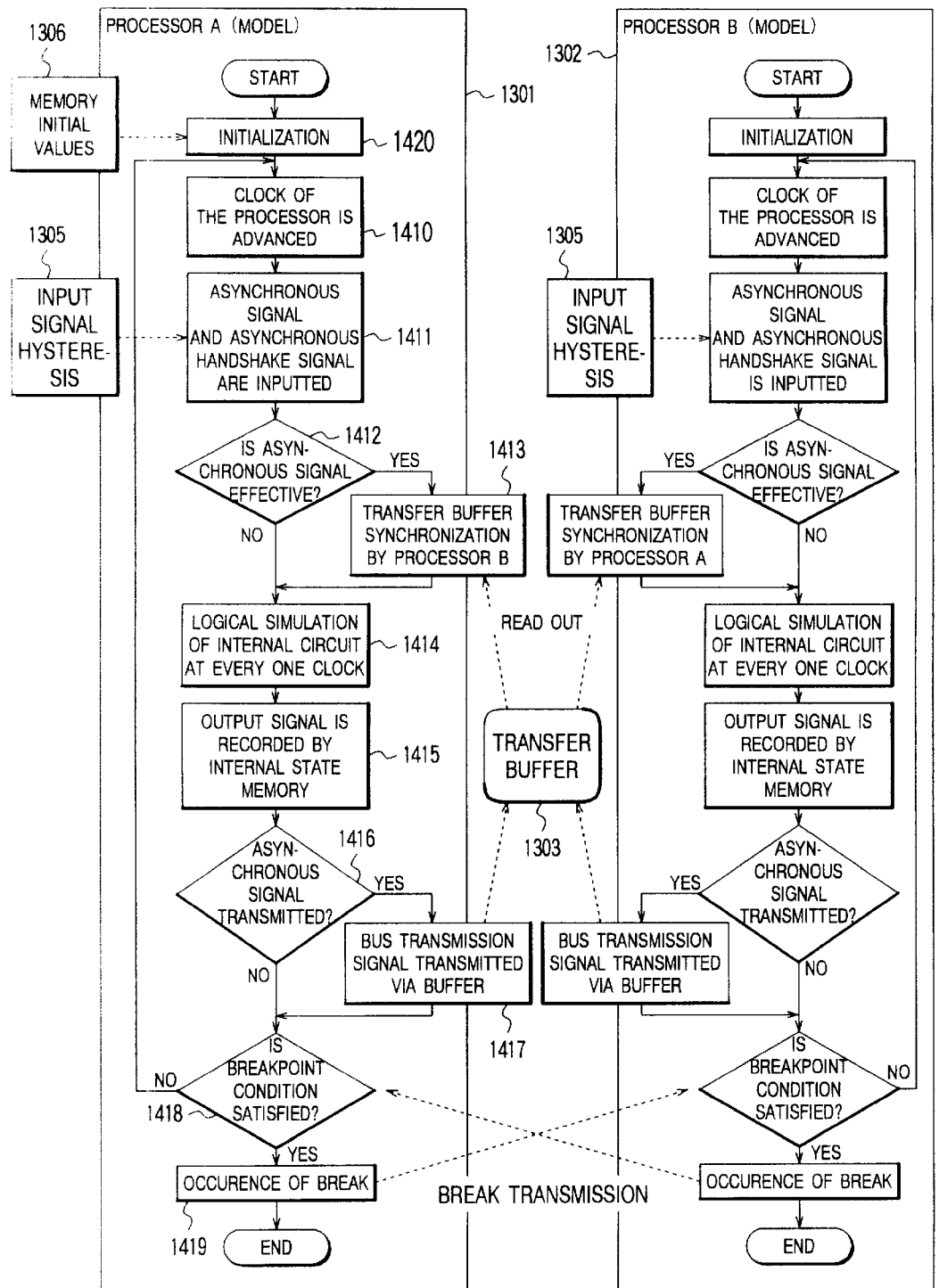
FIG. 14 is a flowchart showing the operation of the software simulator 1151 of FIG. 11.

FIG. 14 shows the software simulator illustrated in FIG. 13.

The thread 1301 and the thread 1302 are operated independently of each other like in the actual processor 1111 and the actual processor 1112 and communicates with each other through the asynchronous transmission bus 1303.

With respect to the mounting by software on the microprocessors, methods of alternate execution at every clock, switching at every occurrence of synchronization waiting and using an OS (Operation System) or a hardware having multi-thread synchronizing function and the like may be considered, however, in any cases, the operation viewed from a user remains unchanged.

Description will be made only about the operation of the thread 1301 in accordance with the flowchart shown by FIG. 14 with the operation of the thread 1302 omitted for brevity of description. Incidentally, the thread 1302 carries out operation similar to the thread 1301.

Step 1420: The memory model 1311 and the like are initialized by the memory initial value 1306 immediately after starting the simulation.

Step 1410: The clock of the processor 1111 is advanced by 1.

Step 1411: The asynchronous signal 1125 and the asynchronous handshake signal 1126 are reproduced and inputted from the input signal hysteresis 1305.

Step 1412: Whether the asynchronous input 1126 is effective at this moment is judged.

Step 1413: If an input is present, the thread 1302 is investigated to detect whether or not synchronization is kept in a standby state with an asynchronous signal to the thread 1301 which is produced. If it is kept in the standby state, an asynchronous bus signal from the thread 1302 is transmitted via the transmission buffer 1303. At the same time, the thread 1302 is restarted. If the synchronization is not kept in the standby state, the thread 1301 is interrupted and is awaited until an asynchronous signal is given form the thread 1302. At this time point, the content of a transmitted signal is calculated by simulation irrespective of the direction of transmission. On reception, the content is added to logical simulation.

Step 1414: The logical simulation of the internal circuits of the processor 1111 is carried out or advanced at every one clock.

Step 1415: An output signal is transmitted to and recorded by the internal state monitor 1304.

Step 1416: It is confirmed whether or not the processor 1111 transmits an asynchronous signal to the processor 1112.

Step 1417: When the processor 1111 produces an asynchronous signal representative of a start of transmission, confirmation is made about whether the thread 1302 is kept in the standby state of synchronizing operation. If the processor 1111 is kept in the standby state of synchronizing operation, a bus transmission signal is transmitted via the buffer 1303. Otherwise, the thread 1301 is interrupted and is put into a waiting state until the processor 1302 is brought into an input state.

Step 1418: Judgement is made from the output signal about whether or not the condition for a breakpoint indicated by a user is satisfied. If it is not satisfied, the operation returns to step 1410.

Step 1419: If the condition is satisfied to specify a breakpoint, the thread 1302 is also interrupted and operation of a user is required. The restarting is carried out from step 1410.

A change in the internal state caused by operating actually a system and an output signal can be monitored by the internal state monitor 1304 in respect to both of the processors 1111 and 1112.

(Reason why asynchronous transmission can be reproduced)

It is normal in asynchronous transmission that a content of a value of the asynchronous signal is read by the use of a synchronous signal other than a signal transferred, in a state in which the asynchronous signal is active. This is because the content of the value read may be undesirably changed depending on timings, unless a stable single bit is used to read the content of the signal.

A plurality of simulation models each operating asynchronously are synchronized by using the above-mentioned synchronizing signal. That is, simulation clocks of both of them are adjusted to each time instant at which the synchronizing signal is actually generated. At each time instant, a value of the asynchronously transmitted signal reproduced by the simulation becomes the same as the content of a transmitted signal actually generated at each time instant. When the value of this signal is transmitted to a simulation model on the receiving side, transmission of the asynchronous signal that is actually generated can be reproduced.

Incidentally, the direction of transmitting the actual asynchronous bus signal in respect of the direction of transmitting the synchronizing signal depends on the use of hardware. This method may be applicable irrespective of the direction of transmission.

Figure 15:
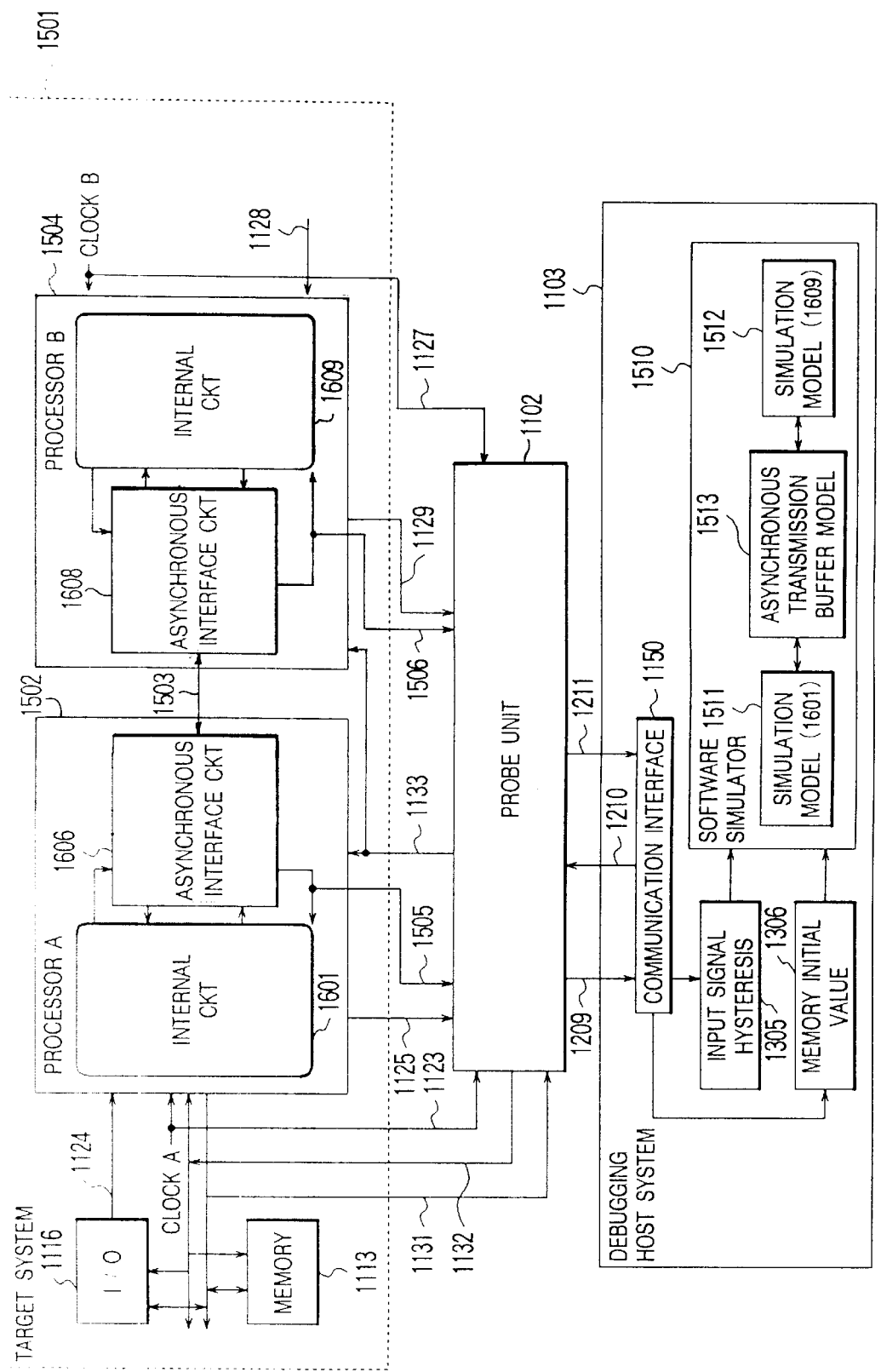
FIG. 15 is a view schematically showing a debugging system according to a third embodiment of the present invention.

FIG. 15 shows a block diagram of a debugging system according to another embodiment of the present invention.

A target system 1501 serves as an object system for observing the operation. The probe unit 1102 is the same as that connected to the target system 1101 in FIG. 11. The probe unit 1102 monitors the operation of the target system 1501 in a manner similar to that illustrated in FIG. 11 and transmits the content to the debugging host system 1103. The debugging host system 1103 has a hardware structure similar to the debugging host system 1103 of FIG. 11 but a software simulator 1510 which is operated in relation to the target system 1501 in a manner different from that illustrated in FIG. 11.

In FIG. 15, the target system 1501 is constituted by a processor A(1502), a processor (B) 1504, the memory 1113, clock signal forming elements, the I/O circuit 1116 and the like. The processor 1502 and the processor 1504 are operated in synchronism with different clocks, respectively. The processor 1502 is connected to an asynchronous bus 1503, the external memory 1113, the control signal bus 1132 leading to the I/O 1116 and the data bus 1131 and is operable in response to the asynchronous signal 1124 and the clock signal 1123. The asynchronous signal 1124 is given as an asynchronous input signal from the external I/O 1116.

The processor 1502 can be divided into a circuit 1601 operable in synchronism with the clock signal 1123 and an asynchronous interface circuit 1606 operable asynchronously with the clock signal 1123. Among the asynchronous inputs supplied to the synchronizing circuit 1601 of the processor 1502, the asynchronous signal 1124 and the transmission request signal 1122 from the asynchronous interface circuit 1606 are each synchronized with the clock signal 1123 whereby a signal 1125 and a signal 1505 are produced. These signals are sent outside of a chip to be tested. A whole of the internal circuit 1601 of the processor 1502 is synchronized by the clock signal 1123 and its behavior can uniquely be reproduced by initial values and input signals.

The following signals are given from the target system 1501 to the probe unit 1102.

1. The signal 1125 and the signal 1505 which are synchronized and which are output signals from the processor 1502.
2. The clock 1123 which is also given to the processor 1502.
3. A signal 1129 and a signal 1506 which are synchronized and which are output signals from the processor 1504.
4. A clock 1127 which is also given to the processor 1504.
5. The control signal 1132 and the data signal 1131 which are interface signals of the processor 1502 and the external memory 1113.

The following signals are sent from the probe unit 1102 to the target system 1501.

1. The reset signal 1133 which is given to both of the processor 1502 and the processor 1504.
2. The control signal 1132 that is an interface signal of the processor 1502 and the processor external memory 1113. The signal is used for the purpose of reading an initial state.

A software simulator 1510 is mainly constituted by a processor model 1511, a processor model 1512, and the asynchronous buffer model 1513.

The processor model 1511 of the software simulator 1510 constitutes a software simulation model corresponding to the internal circuit of the processor 1501. The processor model 1512 constitutes a software simulation model corresponding to the internal circuit of the processor 1502.

Three units of the asynchronous transmission signal 1503, the asynchronous transmission circuits 1606 and 1608 are unified or integrated in function and modeled as two general purpose buffers which are never synchronized with the clocks at all.

The illustrated example differs from the example shown in FIG. 11 in view of the fact that the asynchronous interface signal 1503 is not monitored, that bus signals are transmitted a plurality of times simultaneously on transfer of a single time, and that the transfer timings are not coincident with those of internal handshake signals transmitted to the synchronizing circuit.

Figure 16:
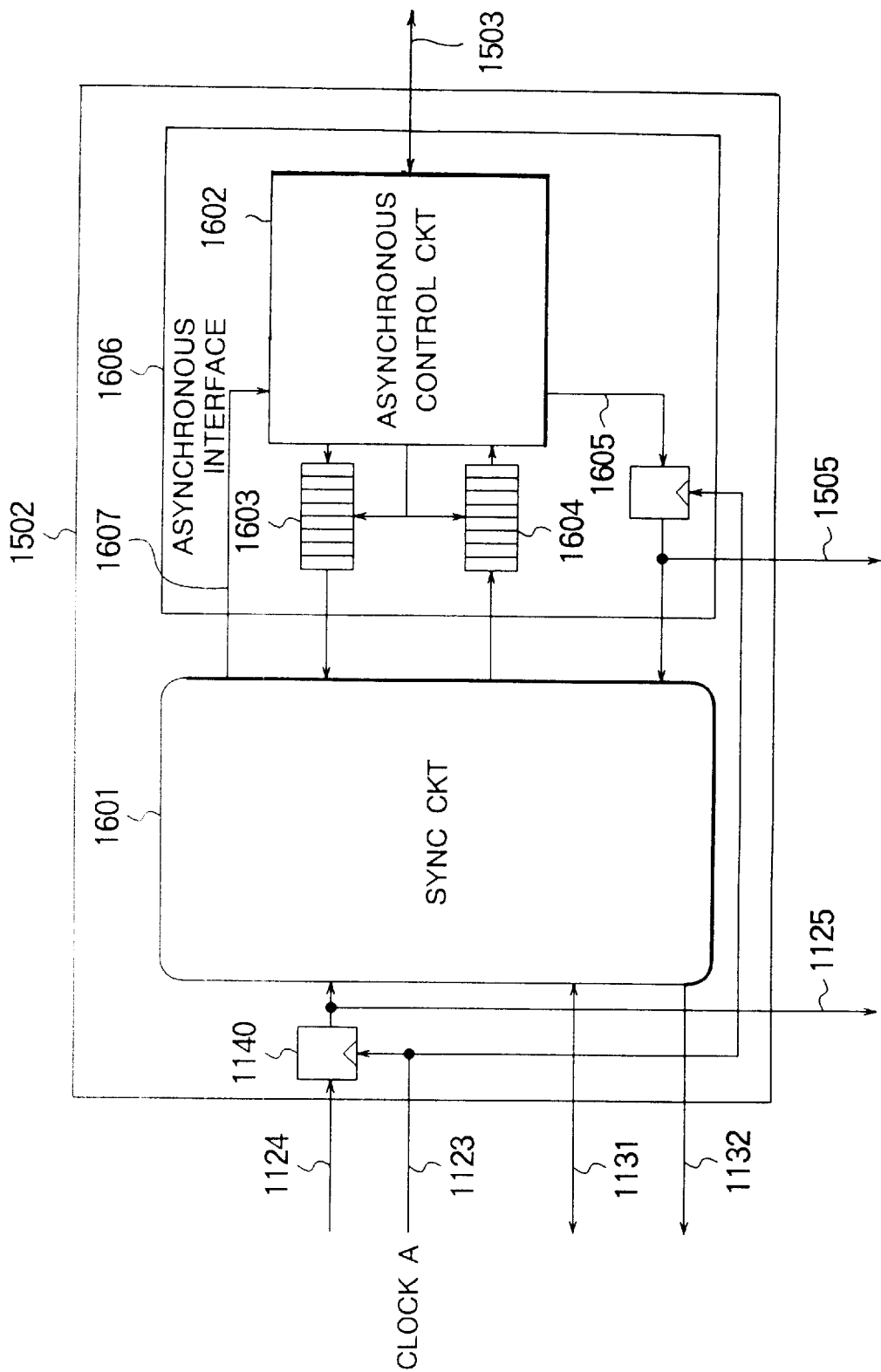
FIG. 16 is a view schematically showing the structure of a processor 1502 of FIG. 15.

FIG. 16 is a schematic view of the processor 1502. The processor 1502 is constituted by a synchronizing circuit 1601, an asynchronous interface circuit 1606 communicating with the asynchronous interface 1503, the external data bus 1131, and the external address bus 1132, and is operable in response to the clock signal input 1123, the asynchronous input signal 1124, and the synchronized output signal 1125.

The asynchronous interface circuit 1606 is constituted by an asynchronous interface control circuit 1602, an asynchronous input buffer 1603, and an asynchronous output buffer 1604, and is internally operated by an asynchronous control input signal 1605, an asynchronous control output 1607, and an asynchronous handshake signal 1606 synchronizing the signal 1605.

With this structure, only the asynchronous input signal 1125 and the asynchronous control signal 1605 are supplied to the outside of the processor 1502.

The operation of asynchronous transmission by using the processor 1502 will be shown below.

An input signal which is given from the asynchronous interface 1503 to the asynchronous communication circuit 1606 is at first stored in the input buffer 1603 through the asynchronous control circuit 1602. Further, a write-in request is issued to the synchronizing circuit 1601 in response to the input request signal 1605. However, the asynchronous control circuit 1602 does not stop inputting a next signal from the asynchronous bus 1503 and stores the next signal in the buffer 1603, if any. The synchronizing circuit 1601 can read the signals out of the input buffer 1603 in the order of arrival from the asynchronous interface 1503.

Figure 17:
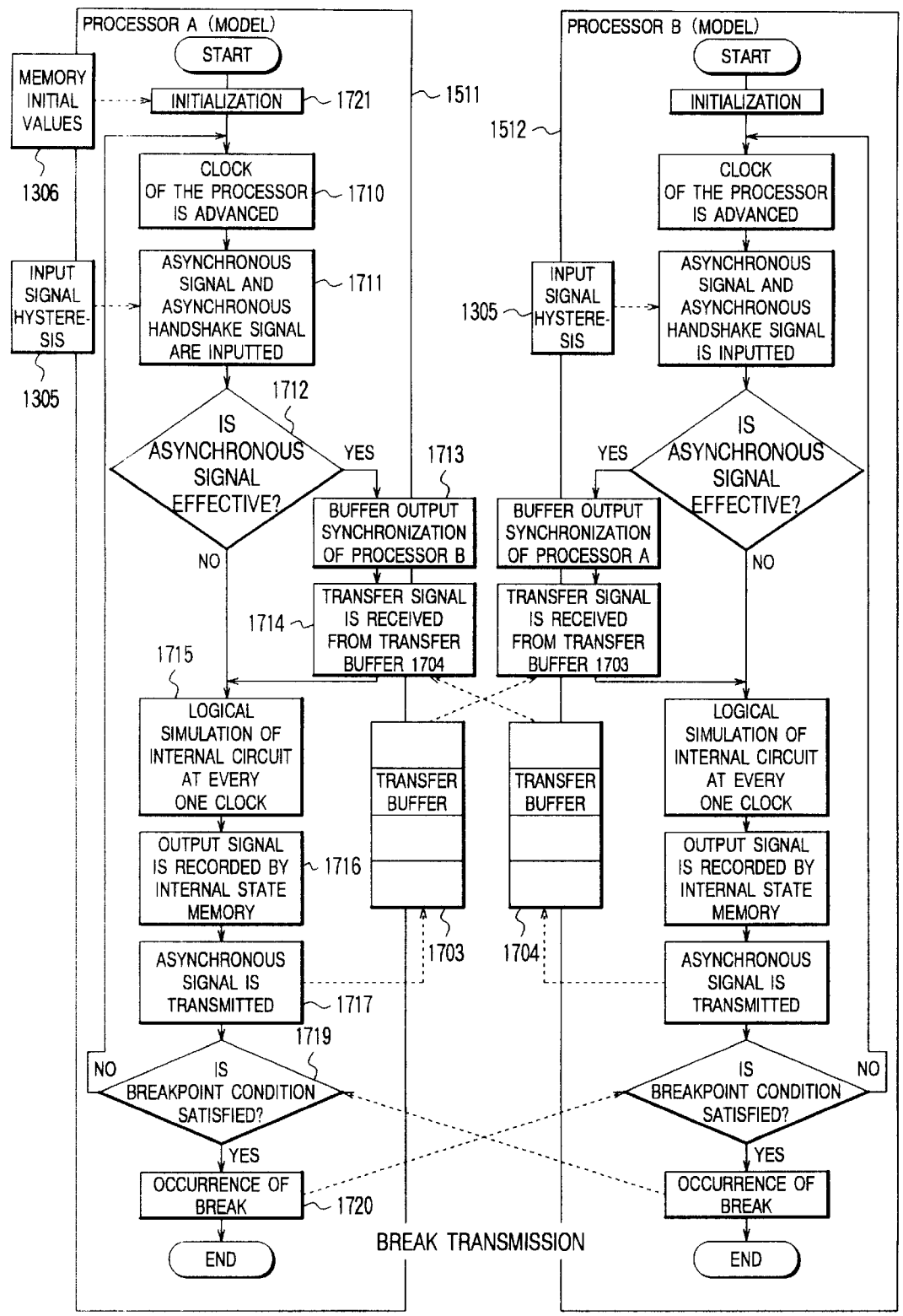
FIG. 17 is a flowchart showing the operation of a software simulator 1510 of FIG. 15.

FIG. 17 shows the operation of the software simulator 1510.

A thread 1701 is representative of a simulation model of the internal circuit 1601 of the processor 1502. The simulation model is operated at every one of the clocks 1123. Likewise, a thread 1702 is representative of a simulation model of an internal circuit 1609 of the processor 1504 and is also operated at evert one of the clocks 1127.

In FIG. 17, a transfer buffer 1703 is shown which is not synchronized with either of the clocks 1123 and 1127. The transfer buffer 1703 detects and inputs a write control signal of data which is to be sent to the asynchronous transmission circuit 1606. The transfer buffer 1703 detects and writes a write control signal of data from the thread 1702. Each data signal is read out of the transfer buffer 1703 in a first-in-first-out fashion. Similar operation is carried out in a transfer buffer also.

In the illustrated example, the transfer buffer 1701 is used on transferring a signal from the processor 1501 to the processor 1502 while the transfer buffer 1702 is used on transferring a signal from the processor 1502 to the processor 1501.

The operation of the thread 1701 will be described hereinunder. First, a memory model 1311 or the like is initialized by an initial value 1306 of the memory immediately after the simulation is started. The operation thereafter will be explained with reference to the flowchart of FIG. 17.

Step 1710: The clock of the processor 1501 is advanced by one to renew a simulation time.

Step 1711: The asynchronous signal 1124 and the asynchronous handshake signal 1126 are reproduced and inputted in response to the input signal hysteresis 1305.

Step 1712: At this moment, judgement is made about whether or not an input is given from transfer buffer 1704.

Step 1713: If no value is stored in the transfer buffer 1704, the operation is kept in the standby state until an input signal is given to the transfer buffer 1704. If any values are stored in the transfer buffer 1704, the thread 1701 which is to be kept in the standby state is restarted.

Step 1714: A transfer signal is received from the transfer buffer 1704.

Step 1715: Logical simulation is carried out in connection with the internal circuit of the processor 1101 for a single clock.

Step 1716: An output signal is transmitted to and recorded by an internal state monitor 1304.

Step 1717: When the transmission control signal to the asynchronous transmission bus is effective, a signal is sent to the asynchronous transmission buffer 1703.

Step 1719: Confirmation is made in response to the output signal about whether or not a condition of a breakpoint indicated by a user is satisfied. Otherwise, operation returns to Step 1710.

Step 1720: When the operation re aches a breakpoint, the thread 1702 is also interrupted and the operation of a user is put into a standby state. Subsequent operation is restarted from Step 1710.

In this way, when transfer operation is made by the use of a buffer, a model may be formed such that a value may be uniquely supplied from a reading side when the value is written through a writing side.

In such an interface, a transmission request is issued to a processor in a state in which the buffer is full.

The present invention may be applicable to a system which has a serial interface having no synchronizing signal or a synchronizing bus interface which is operable asynchronously with a processor and which transmits a great amount of information at a high speed.

Incidentally, the present invention is also applicable to an LSI which has a synchronizing circuit such that internal states can not be usually observed and a high speed synchronizing I/O interface. Such application can be accomplished by preparing the following means.

1. A means for outputting or initializing internal states of all the synchronizing circuits.

2. A means for storing a hysteresis of all the inputted synchronizing signals and storing a hysteresis of initial signals of asynchronous signals which are synchronized by respective synchronizing circuits, to transmit them.

3. A the simulation model which can simulate all of the synchronizing circuits and which has means for determining the initial states mentioned in item 1 and means for inputting signals synchronized, as mentioned in item 2.

By utilizing the above-described means, it is possible to provide a means for completely observing a system of general synchronizing circuits.

Further, the present invention is applicable by using the following means even in the case where a plurality of synchronizing circuits carry out asynchronous operations.

1. A means which is for outputting or initializing internal states of all the synchronizing circuits.

2. A means which is for storing a hysteresis of all the signals from circuits having no simulation model and storing and transmitting a hysteresis of initial signals of asynchronous signals that are synchronized by respective synchronizing circuits in respect of all the synchronizing circuits.

3. A means which is for monitoring only a signal serving to control a means for masking other asynchronous signal input among signals inputted from an asynchronous circuit to a synchronizing circuit.

4. In asynchronous transmission among synchronizing circuits, a means which has a transmitting side limited to a single circuit so as to transmit, from a reading side, contents of a signal which are inputted with no change, or a means for uniquely converting a signal on a writing side to transmit an output signal, or a means for storing a transmission order of a plurality of transmissions.

5. A simulation model which can simulate all of interfaces among synchronizing circuits, a means for inputting the initial states mentioned in item 1 and the synchronizing signals mentioned in items 2 and 3.

6. With respect to an asynchronous interface having a capacity whereby a plurality of synchronizing circuits constitute transmitting sides in asynchronous transmission among synchronizing circuits, a means which has a function of storing the transmission order for outputting information where a receiving side specifies a transmitting side, and a means for storing the information.

7. All of simulation models which can simulate interfaces among synchronizing circuits, a means for inputting the information where the transmitting side is specified of item 6 in addition to the initial state of item 1 and the synchronizing signals of items 2 and 3.

A complete observing means can be provided to a logical circuit constituted by general asynchronous interfaces and synchronizing circuits by using the above-described means.

As has been mentioned before, according to the present invention, complete observation of all the time and all the internal states of a microprocessor becomes feasible. Although the above-described Conventional Example 1 and Conventional Example 2 can only observe the operational procedure of a program, the present invention can observe all the instructed operations, all the variables,and all of execution time of a microprocessor.

Further, operation can completely be reproduced by the software simulator when an initial state and input data signals synchronized with clocks are completely prepared in the system synchronized with the clocks. Furthermore, according to the present invention, even with a system including a circuit asynchronous with clock, with respect only to an internal state of a portion synchronized with the clocks, the observation can be carried out.

Also, according to the present invention, compared with the software simulator of the above-described Conventional Example 3, it is not necessary to form a model of the external I/O interface.

Actually, according to the system having an I/O interface or the like, the operation of the microprocessor is strongly concerned with the operation of the I/O interface. Therefore, reproduction of the I/O interface by a complete software model was indispensable even for the purpose of only reproducing completely the operation of the microprocessor. However, according to the present invention, only a necessary portion of the operation of the external I/O interface can be captured and integrated to the operation and accordingly, the software model of the external interface needs not to be formed. Furthermore, according to the present invention, an analysis of not only a microprocessor but coordinating operation of a plurality of synchronizing circuits can be performed. When the software simulator model of the memory system or the graphic accelerator capable of outputting and capturing signals asynchronously operating with system clock from a memory system, the graphic accelerator or the like is prepared which has interfaces with speeds too fast to be observed and which inputs the captured trace result, an analysis of not only the operation of a microprocessor but also coordinated operation with the memory system, the accelerator or the like can be conducted.

As described above, according to the present invention, simulation of a total can be conducted even with a system where a plurality of clocks are operated asynchronously.

Further, even in the case where a board of a certain I/O device or the like is newly integrated into a system, when the I/O device is provided with a means for writing a synchronizing signal to a common trace memory and a software model of the I/O device and a method of reading an input signal trace memory a re provided together in a form the same as that of a device driver of the I/O device and integrated to a simulation model of an original system, the operation of a total system coordinated with the newly integrated I/O device can be debugged. According to the present invention, compared with a conventional software debugging system, information in respect of the operation of a system can completely be obtained. Therefore, the operation of variables at a software debugger at a higher order can be traced and function analysis of each function of a program can be conducted.

Further, according to the present invention even in a system where a plurality of clocks are operated asynchronously, the operation can be reproduced completely while omitting most of record of communication among asynchronous circuits. In this case, the reproduction is realized by storing only synchronizing timings of transmission as a history.

Further, even in the case where only one asynchronous signal is inputted and a frequency of change of the asynchronous signal is large as in a serial interface, the operation can simultaneously be reproduced completely while omitting most of storing operation of synchronizing timings thereof.

Even in the case where high speed synchronizing bus interfaces operating with asynchronous clocks are connected to respective logical circuits, the operation can completely be reproduced only by monitoring internal handshake signals having a comparatively low speed without monitoring synchronizing buses at all.

Even in the case where a plurality of synchronizing circuits are connected asynchronously and an outputting side is not uniquely determined, the operation of a system can similarly be reproduced completely if a recording means is provided by outputting information specifying a transmitting side.

What is claimed is:

1. A debugging system which is used in a system which has a microprocessor and a logical circuit synchronized with a system clock, said debugging system comprising:

initializing means for outputting an initial state of the logical circuit or uniquely initializing the logical circuit;

first storing means for monitoring at least a portion of an input signal in synchronism with the system clock of the microprocessor and storing the input signal as a stored input signal;

first reproducing means for reproducing at every cycle of the system clock an internal operation of a circuit included in the system which cannot be observed from outside by transmitting a hysteresis of the stored input signal;

a synchronizing circuit which operates in synchronism with the same system clock and which is located outside the microprocessor;

second reproducing means for monitoring and reproducing an input signal inputted to the synchronizing circuit in addition to an input signal from outside the microprocessor; and third reproducing means for reproducing both of the microprocessor and the synchronizing circuit so as to dispense with monitoring input and output signals between the microprocessor and the synchronizing circuit.

2. A debugging system which is used in a system which has a microprocessor and a logical circuit synchronized with a system clock, said debugging system comprising:

initializing means for outputting an initial state of the logical circuit or uniquely initializing the logical circuit;

first storing means for monitoring at least a portion of an input signal in synchronism with the system clock of the microprocessor and storing the input signal as a stored input signal;

first reproducing means for reproducing at every cycle of the system clock an internal operation of a circuit included in the system which cannot be observed from outside by transmitting a hysteresis of the stored input signal;

an asynchronous circuit operating asynchronously with the system clock;

outputting means for separately outputting a signal transmitted from the asynchronous circuit to the logical circuit;

second storing means for separately outputting a signal transmitted from the outputting means as an input signal; and second reproducing means for reproducing a coordinating operation coordinating with the asynchronous circuit by using the input signal.

3. A debugging system which is used in a system which has a microprocessor and a logical circuit synchronized with a system clock, said debugging system comprising:

initializing means for outputting an initial state of the logical circuit or uniquely initializing the logical circuit;

first storing means for monitoring at least a portion of an input signal in synchronism with the system clock of the microprocessor and storing the input signal as a stored input signal;

first reproducing means for reproducing at every cycle of the system clock an internal operation of a circuit included in the system which cannot be observed from outside by transmitting a hysteresis of the stored input signal;

an asynchronous circuit operating asynchronously with the system clock;

first outputting means for outputting in synchronism with the clock only a handshake input signal from the asynchronous circuit among signals transmitted from the asynchronous circuit to the logical circuit;

second outputting means for outputting a bus signal from the asynchronous circuit to a common bus of the microprocessor without synchronizing the bus signal; and second reproducing means for reproducing a coordinating operation by reproducing an input form the asynchronous circuit to the logical circuit by using output signal from the first and the second outputting means.

4. A debugging system which is used in a system which has a microprocessor and a logical circuit synchronized with a system clock, said debugging system comprising:

initializing means for outputting an initial state of the logical circuit or uniquely initializing the logical circuit;

first storing means for monitoring at least a portion of an input signal in synchronism with the system clock of the microprocessor and storing the input signal as a stored input signal, first reproducing means for reproducing at every cycle of the system clock an internal operation of a circuit included in the system which cannot be observed from outside by transmitting a hysteresis of the stored input signal; wherein the microprocessor is provided with a means for preserving an initial state of the system to a memory, further comprising:

second storing means for observing and storing the input signal;

reading means for reading as a read input signal the input signal stored in the second storing means; and second reproducing means for reproducing an operation of the system by using the read input signal.

5. A debugging system used in a system, said system comprising:

a plurality of mounted microprocessors;

a common memory;

a bridge to an external low speed synchronizing I/O bus;

a high speed synchronizing bus for connecting and operating the plurality of microprocessors, the common memory and the bridge in synchronism with a system clock;

an I/O interface for carrying out a plurality of asynchronous operations;

the I/O interface being connected to the external low speed synchronizing I/O bus and a signal being transmitted to the bridge via the low speed synchronizing bus;

said debugging system further comprising:

first storing means, which is connected to the synchronizing I/O bus, for monitoring and storing only a signal reaching the bridge.

6. The debugging system according to claim 5, further comprising:

first reproducing means for reproducing operations of the plurality of microprocessors, the common memory, and the I/O interface by the use of the stored signal.

7. The debugging system according to claim 6, wherein a high speed synchronizing circuit is connected to the external I/O bus, further comprising:

second storing means for monitoring and storing an asynchronous input signal of the high speed synchronizing circuit;

the first reproducing means reproducing an operation of the high speed synchronizing circuit in response to the stored asynchronous input signal.

8. A debugging system which is used in a system having a high speed digital synchronizing circuit or a high speed interface which is operable too fast to observe an internal operation thereof, said debugging system comprising:

output means for outputting as out-out signals, in synchronism with a system clock, input signals among elements of the system;

storing means for storing as stored information each of the output signals by snooping each of the output signals from the output means;

first reproducing means for reproducing the internal operation of the synchronizing circuit or the high speed interface of the system by using the stored information;

a microprocessor operable in synchronism with the system clock;

a synchronizing circuit operating in synchronism with a second system clock different from the system clock;

first monitoring means for monitoring, within input signals given to the microprocessor, a synchronized input signal, an asynchronous input signal synchronized with the system clock of the microprocessor, and a asynchronous handshake signal concerned with the synchronizing circuit to produce first monitored output signals representative of results of the monitoring;

second monitoring means for monitoring, within input signals given o the synchronizing circuit, the synchronized input signal, an asynchronous signal synchronized by the second clock of the synchronizing circuit, and the asynchronous handshake signal concerned with the microprocessor to produce second monitored output signals representative of results of the monitoring;

second reproducing means for reproducing both of the microprocessor and the synchronizing circuit in response to the first and the second monitored output signals; and third reproducing means for reproducing a content of transmission between the microprocessor and the synchronizing circuit on the basis of a reproduced output from the second reproducing means.

9. The debugging system according to claim 8, further comprising:

synchronizing circuit reproducing means for reproducing the synchronizing circuit in response to the input signals and the clock both of which are given to the synchronizing circuit; and the synchronizing circuit reproducing means transferring a transmitted output signal reproduced by the synchronizing circuit reproducing means to destined synchroninzing circuit reproducing means on the basis of the input hysteresis of a transmission handshake signal between the synchronizing circuit reproducing means after performing a real time synchronization between the synchronizing circuit reproducing means.

10. The debugging system according to claim 9, further comprising:

fourth reproducing means for reproducing one of the synchronizing circuits, reproducing the synchronizing circuit placed on the transmitting side by temporarily stopping the operation at a time point at which detection is made about the asynchronous handshake signal indicative of communication with another synchronizing circuit, and restarting the operation of the synchronizing circuit at a time point at which an output of the asynchronous handshake signal is reproduced synchronously, to establish synchronization of the transmission operation.

11. The debugging system according to claim 8, further comprising:

a logical circuit having the synchronizing circuit operating in synchronism with the second system clock different from the system clock of the microprocessor;

storing means for storing asynchronously with the clock information transmitted from an asynchronous interface circuit on a counterpart side in a communication between the microprocessor and the logical circuit;

an asynchronous interface circuit through which the synchronizing circuit in the microprocessor receives information from the storing means;

the microprocessor including a clock synchronizing circuit, an asynchronous interface circuit, and first output means for producing a bus signal which connects the clock synchronizing circuit to the asynchronous interface circuit, an asynchronous handshake signal, and an input signal given to the microprocessor immediately after the asynchronous handshake signal is synchronized;

the logical circuit including a clock synchronizing circuit, an asynchronous interface circuit, and second output means for producing a bus signal which connects the clock synchronizing circuit and the asynchronous interface circuit, an input signal given to the logical circuit, and the asynchronous handshake signal immediately after the asynchronous handshake signal is synchronized;

first transmitting means for synchronizing both the input signal and the asynchronous handshake signal sent from the microprocessor to keep the results as a hysteresis and to transfer all of the hysteresis; and second transmitting means for synchronizing both the synchronized input signal and the asynchronous handshake signal sent from the logical circuit to store the results as a hysteresis and to transfer all of the hysteresis;

said debugging system further comprising:

fourth reproducing means for reproducing operations of both of the microprocessor and the logical circuit by using all of the histories of the transmitted synchronizing input signals and the transmitted asynchronous handshake signals; and fifth reproducing means for reproducing a content of mutual transmission between the microprocessor and the logical circuit in accordance with a result of reproduction by the fourth reproducing means.

12. The debugging system according to claim 11, further comprising:

inner synchronizing circuit reproducing means for reproducing a logical operation of the synchronizing circuit within the microprocessor; and sixth reproducing means for reproducing a communication from the logical circuit by temporarily stopping a reproducing operation at a time point at which a read request from an asynchronous communication circuit is restarted, performing a logical operation of the logical circuit at a counterpart of communication, and restarting an operation of the asynchronous communication circuit at a time point at which an output from the asynchronous communication circuit requested by the microprocessor is reproduced.

13. The debugging system according to claim 11, wherein a plurality of logical circuits are connected to one asynchronous interface and transmitting means for supplying signals from a plurality of synchronizing circuits to the asynchronous interface, said debugging system further comprising:

third outputting means for producing information whereby the logical circuit on a receiving side of the transmitting means specifies the logical circuit on a transmitting side thereof;

storing means for storing a result of outputting the information from the third outputting means; and sixth reproducing means for reproducing operations of all of the plurality of logical circuits connected to the asynchronous interface by using the specified information.

* * * * *

UNITED STATES PATENT AND TRADEMARK OFFICE
CERTIFICATE OF CORRECTION

PATENT NO.    : 6,145,099
DATED         : November 7, 2000
INVENTOR(S)   : K. Shindou It is certified that error appears in the above-identified patent and that said Letters Patent is hereby corrected as shown below:

Title page,
Item [56], References Cited, FOREIGN PATENT DOCUMENTS, insert
-- HEI 8-214819  8/1994   Japan
   HEI 8-147191  6/1996   Japan
   HEI 3-296142  12/1991  Japan
   HEI 3-57029   3/1991   Japan --

Column 19,
Line 60, "re aches" should read -- reaches --

Column 21,
Line 48, "a re" should read -- are --

Signed and Sealed this

Ninth Day of April, 2002

Attest:

Attesting Officer

JAMES E. ROGAN
Director of the United States Patent and Trademark Office